United States Patent
Yoshida

(10) Patent No.: US 12,153,974 B2
(45) Date of Patent: Nov. 26, 2024

(54) ARITHMETIC APPARATUS AND MULTIPLY-ACCUMULATE SYSTEM

(71) Applicant: Sony Group Corporation, Tokyo (JP)

(72) Inventor: Hiroshi Yoshida, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 565 days.

(21) Appl. No.: 17/440,835

(22) PCT Filed: Mar. 12, 2020

(86) PCT No.: PCT/JP2020/010697
§ 371 (c)(1),
(2) Date: Sep. 20, 2021

(87) PCT Pub. No.: WO2020/195867
PCT Pub. Date: Oct. 1, 2020

(65) Prior Publication Data
US 2022/0164551 A1 May 26, 2022

(30) Foreign Application Priority Data
Mar. 27, 2019 (JP) .................. 2019-060707

(51) Int. Cl.
G06G 7/16 (2006.01)
G06G 7/14 (2006.01)
G06N 3/065 (2023.01)

(52) U.S. Cl.
CPC ............... *G06G 7/16* (2013.01); *G06G 7/14* (2013.01); *G06N 3/065* (2023.01)

(58) Field of Classification Search
CPC .......... G06F 7/523; G06F 7/50; G06F 7/5443; G06F 17/10; G06F 17/15–153;
(Continued)

(56) References Cited

U.S. PATENT DOCUMENTS

2014/0172937 A1* 6/2014 Linderman ............ G06G 7/16
708/607
2018/0253642 A1* 9/2018 Gokmen ................ G06N 3/084
(Continued)

FOREIGN PATENT DOCUMENTS

JP 2009-049872 A 3/2009
WO 2018/034163 A1 2/2018

OTHER PUBLICATIONS

Yamaguchi, Masatoshi, et al. "An Energy-Efficient Time-Domain Analog VLSI Neural Network Processor Based on a Pulse-Width Modulation Approach." arXiv.Org, Feb. 16, 2019, arxiv.org/abs/1902.07707. (Year: 2019).*

(Continued)

*Primary Examiner* — Emily E Larocque
*Assistant Examiner* — Huy Duong
(74) *Attorney, Agent, or Firm* — Michael Best & Friedrich LLP

(57) ABSTRACT

An arithmetic apparatus includes input line pairs and a multiply-accumulate device. A signal pair is input to the input line pairs within an input period. The multiply-accumulate device includes multiplication units, an accumulation unit, a charging unit, and an output unit. The multiplication units generate a positive weight charge and a negative weight charge. The accumulation unit accumulates the positive weight charge and the negative weight charge. The charging unit charges the accumulation unit after the input period. The output unit performs, after charging starts, threshold determination using a predetermined threshold value on a voltage of the accumulation unit, to thereby output a positive multiply-accumulate signal representing a sum of positive weight product values and a negative multiply-accumulate signal representing a sum of negative weight product values.

24 Claims, 11 Drawing Sheets

(58) Field of Classification Search
CPC .... G06F 17/16; G06F 15/7821; G06F 15/785; G06N 3/048; G06N 3/049; G06N 3/065; G11C 11/54; G06G 7/14; G06G 7/16
See application file for complete search history.

(56) References Cited

U.S. PATENT DOCUMENTS

| | | | |
|---|---|---|---|
| 2019/0026627 A1* | 1/2019 | Hatcher | G06N 3/04 |
| 2019/0050721 A1* | 2/2019 | Busch | G06N 3/04 |
| 2020/0356847 A1* | 11/2020 | Yi | G06F 17/16 |
| 2022/0101085 A1* | 3/2022 | Garcia Redondo | G06N 3/065 |
| 2022/0165311 A1* | 5/2022 | Kimura | G11C 11/54 |
| 2022/0180164 A1* | 6/2022 | Rasch | G06N 3/08 |

OTHER PUBLICATIONS

Yamaguchi, Masatoshi. "An Energy-Efficient Time-Domain Analog CMOS...Approach.", 2017, https://www.researchgate.net/publication/348028416_An_Energy-Efficient_Time-Domain_Analog_CMOS_BinaryConnect_Neural_Network_Processor_Based_on_a_Pulse-Width_Modulation_Approach (Year: 2017).*

* cited by examiner

□ : Synapse circuit
▷ : Neuron circuit

ARITHMETIC APPARATUS AND MULTIPLY-ACCUMULATE SYSTEM

TECHNICAL FIELD

The present technology relates to an arithmetic apparatus and a multiply-accumulate system that can be applied to a multiply-accumulate operation using an analog method.

BACKGROUND ART

Conventionally, a technology for performing a multiply-accumulate operation has been developed. The multiply-accumulate operation is an operation of multiplying each of a plurality of input values by a weight and adding the multiplication results to each other, and is used for, for example, processing of recognizing images, voices, and the like through a neural network or the like.

For example, Patent Literature 1 describes an analog circuit in which multiply-accumulate processing is performed in an analog manner. In this analog circuit, a weight corresponding to each of a plurality of electrical signals is set. Moreover, charges depending on the corresponding electrical signals and weights are respectively output and the output charges are accumulated in a capacitor as appropriate. A value to be calculated, which represents a multiply-accumulate result, is calculated on the basis of the voltage of the capacitor in which the charges are accumulated. Accordingly, it is possible to reduce the power consumption required for the multiply-accumulate operation as compared with, for example, digital processing (paragraphs [0003], [0049] to [0053], and of specification, FIG. 3, and the like of Patent Literature 1).

CITATION LIST

Patent Literature

Patent Literature 1: WO 2018/034163

DISCLOSURE OF INVENTION

Technical Problem

The use of such an analog-type circuit is expected to lead to low power consumption of the neural network or the like, and it is desirable to provide a technology that simplifies the circuit configuration and realizes high-speed arithmetic operation processing.

In view of the above-mentioned circumstances, it is an object of the present technology to provide an arithmetic apparatus and a multiply-accumulate system, by which a circuit configuration can be simplified and high-speed arithmetic operation processing can be realized.

Solution to Problem

In order to accomplish the above-mentioned object, an arithmetic apparatus according to an embodiment of the present technology includes a plurality of input line pairs and one or more multiply-accumulate devices.

A signal pair corresponding to an input value is input into each of the plurality of input line pairs within a predetermined input period.

The one or more multiply-accumulate devices each include a plurality of multiplication units, an accumulation unit, a charging unit, and an output unit.

The plurality of multiplication units is respectively connected to at least some of the plurality of input line pairs and is capable of generating each of a positive weight charge corresponding to a positive weight product value obtained by multiplying a signal value of one signal of the signal pair input into the input line pair to which the multiplication unit is connected by a positive weight value and a negative weight charge corresponding to a negative weight product value obtained by multiplying a signal value of another signal by a negative weight value.

The accumulation unit is capable of accumulating the positive weight charge and the negative weight charge which are generated by each of the plurality of multiplication units.

The charging unit charges the accumulation unit in which a charge corresponding to the product value is accumulated after the input period.

The output unit performs, after charging by the charging unit starts, threshold determination using a predetermined threshold value on a voltage retained by the accumulation unit, to thereby output a positive multiply-accumulate signal representing a sum of the positive weight product values and a negative multiply-accumulate signal representing a sum of the negative weight product values.

Moreover, in the one or more multiply-accumulate devices, charging by the charging unit is performed on a common charging mode and a common threshold value is set as the predetermined threshold value.

In this arithmetic apparatus, in the one or more multiply-accumulate devices, the positive weight charge and the negative weight charge are generated by multiplying the respective signal values of the signal pair corresponding to the input value by the positive and negative weight values and are accumulated in the accumulation unit. The accumulation unit is charged by the charging unit, and the threshold determination is performed on its voltage by using the predetermined threshold value, such that the positive and negative multiply-accumulate signals are output. Accordingly, a circuit or the like for integrating arithmetic operation results into one signal can be omitted. Moreover, in the one or more multiply-accumulate devices, the charging by the charging unit is performed on the common charging mode, and the common threshold value is used in the threshold determination. Accordingly, the arithmetic operations of the respective multiply-accumulate devices can be performed at the same timing as appropriate. As a result, a circuit configuration can be simplified and high-speed arithmetic operation processing can be realized.

The common charging mode may include charging according to a common time constant.

The common charging mode may include charging based on a maximum sum total value of a sum total value of the positive weight values and a sum total value of absolute values of the negative weight values, the maximum sum total value being maximum among the one or more multiply-accumulate devices, the positive weight values and the negative weight values being set in the plurality of multiplication units.

The common charging mode may charge the accumulation unit in accordance with a time constant according to the maximum sum total value.

The plurality of input line pairs may supply a charging signal that enters an ON state after the input period. In this case, the charging unit may charge the accumulation unit by accumulating charges generated by the plurality of multiplication units on the basis of the charging signal.

The charging unit may include a resistor for charging and a charging line that is connected to the accumulation unit via the resistor for charging and supplies a charging signal that enters an ON state after the input period.

The resistor for charging may be set to have a resistance value according to the maximum sum total value.

The plurality of input line pairs may enter an OFF state after the input period. In this case, the charging unit may charge the accumulation unit by accumulating a charge generated by the resistor for charging on the basis of the charging signal.

The common threshold value may be set on the basis of the maximum sum total value.

The common threshold value may be set on the basis of a voltage curve representing a change in voltage of the accumulation unit over time in a case where the accumulation unit is charged via a resistor having a resistance value according to the maximum sum total value.

The positive weight value and an absolute value of the negative weight value may be set to a same value for each of the plurality of multiplication units.

The positive weight value and an absolute value of the negative weight value may be fixed to a same value.

The positive weight value and an absolute value of the negative weight value may be set to any one of a plurality of values different from each other.

The one or more multiply-accumulate devices may be a plurality of multiply-accumulate devices connected in parallel to the plurality of input line pairs.

A sum total value of the positive weight values and a sum total value of absolute values of the negative weight values may be set to common sum total values equal to each other in the multiply-accumulate device. In this case, the plurality of multiply-accumulate devices may include the common sum total values set to a same value.

A sum total value of the positive weight values and a sum total value of absolute values of the negative weight values may be set to common sum total values equal to each other in the multiply-accumulate device. In this case, the plurality of multiply-accumulate devices may include multiply-accumulate devices including the common sum total values different from each other.

The input value may be represented by a sum of a positive value and a negative value. In this case, the signal pair may include a positive signal having the positive value as a signal value and a negative signal having an absolute value of the negative value as a signal value. Moreover, the plurality of multiplication units may include at least one of a first multiplication unit that generates the positive weight charge by multiplying a signal value of the positive signal by the positive weight value and generates the negative weight charge by multiplying a signal value of the negative signal by the negative weight value or a second multiplication unit that generates the positive weight charge by multiplying a signal value of the negative signal by the positive weight value and that generates the negative weight charge by multiplying a signal value of the positive signal by the negative weight value.

The plurality of input line pairs may each include a positive input line into which the positive signal is input and a negative input line into which the negative signal is input. In this case, the one or more multiply-accumulate devices may include a positive charge output line and a negative charge output line. Moreover, the first multiplication unit may include a resistor that is connected between the positive input line and the positive charge output line, defines the positive weight value, and outputs the positive weight charge to the positive charge output line and a resistor that is connected between the negative input line and the negative charge output line, defines the negative weight value, and outputs the negative weight charge to the negative charge output line. Moreover, the second multiplication unit may include a resistor that is connected between the negative input line and the positive charge output line, defines the positive weight value, and outputs the positive weight charge to the positive charge output line and a resistor that is connected between the positive input line and the negative charge output line, defines the negative weight value, and outputs the negative weight charge to the negative charge output line.

The accumulation unit may include a positive charge accumulation unit that is connected to the positive charge output line and accumulates the positive weight charge and a negative charge accumulation unit that is connected to the negative charge output line and accumulates the negative weight charge. In this case, the charging unit may charge each of the positive charge accumulation unit and the negative charge accumulation unit. Moreover, the output unit may perform threshold determination using the common threshold value on the positive charge accumulation unit to thereby output the positive multiply-accumulate signal and performs threshold determination using the common threshold value on the negative charge accumulation unit to thereby output the negative multiply-accumulate signal.

A multiply-accumulate system according to an embodiment of the present technology includes a plurality of input lines, a plurality of analog circuits, and a network circuit.

A plurality of analog circuits each includes a plurality of multiplication units, an accumulation unit, a charging unit, and an output unit.

The network circuit is configured by connecting the plurality of analog circuits.

Moreover, in the plurality of analog circuits, charging by the charging unit is performed on a common charging mode and a common threshold value is set as the predetermined threshold value.

MODE(S) FOR CARRYING OUT THE INVENTION

Hereinafter, embodiments according to the present technology will be described with reference to the drawings.
[Configuration of Arithmetic Apparatus]

Figure 1:
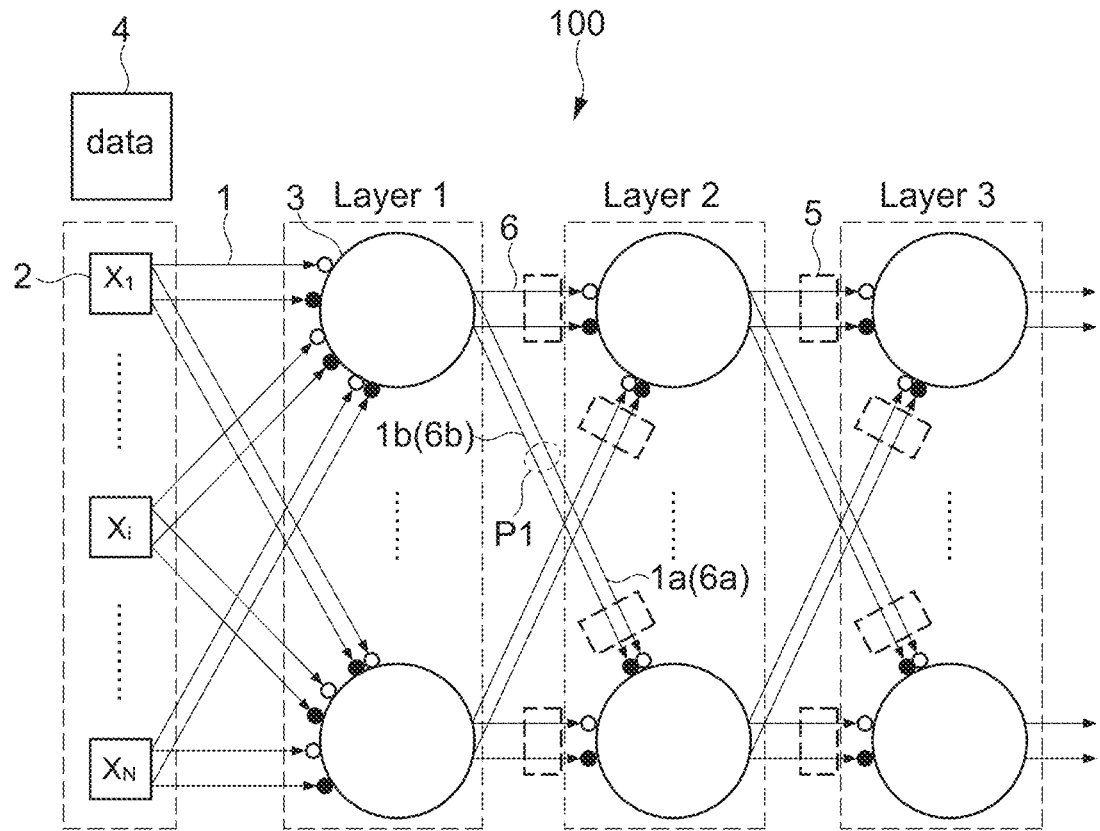
FIG. 1 A schematic diagram showing a configuration example of an arithmetic apparatus according to an embodiment of the present technology.

FIG. 1 is a schematic diagram showing a configuration example of an arithmetic apparatus according an embodiment of the present technology. An arithmetic apparatus 100 is an analog-type arithmetic apparatus that performs predetermined arithmetic processing including a multiply-accumulate operation. By using the arithmetic apparatus 100, for example, it is possible to perform arithmetic processing according to a mathematical model such as a neural network.

The arithmetic apparatus 100 includes a plurality of signal lines 1, a plurality of input units 2, and a plurality of analog circuits 3. Each of the signal lines 1 is a line that transmits a predetermined type of electrical signal. For example, an analog signal representing a signal value by using an analog amount such as a pulse timing and a pulse width is used as the electrical signal. The directions in which electrical signals are transmitted are schematically shown in FIG. 1 by means of arrows.

As shown in FIG. 1, the signal line 1 includes positive signal lines 1a and negative signal lines 1b. Each of the positive signal lines 1a and each of the negative signal lines 1b are wired as a pair and used as a pair of signal lines 1. In the following description, the pair of signal lines 1 constituted by the positive and negative signal lines 1a and 1b will be described as a signal line pair P1. It should be noted that in FIG. 1, the positive signal line 1a is a signal line 1 connected to a connection point as the white circle and the negative signal line 1b is a signal line 1 connected to a connection point as the black circle.

The signal line pair P1 transmits a signal pair corresponding to an input value (or output value). The signal pair is a pair of electrical signals input into the positive and negative signal lines 1a and 1b, respectively. Each signal value of the pair of electrical signals represents the input value. That is, it can be said that the signal line pair P1 functions as a transmission path for transmitting the input value.

An input value x is represented by a sum of a positive value $x^+$ and a negative value $x^-$. Here, the positive value $x^+$ is a real number of 0 or more ($x^+ \geq 0$). Moreover, the negative value $x^-$ is a real number of 0 or less ($x^- \leq 0$). Therefore, the input value x is represented by $x=x^++x^-$ as a sum of the positive value $x^+$ and the negative value $x^-$. Here, in a case where an absolute value of the negative value $x^-$ is used, the input value x is represented by $x=x^+-|x^-|$ as a difference between the positive value $x^+$ and the absolute value of the negative value $x^-$. Thus, the input value x can be represented using a difference between two positive real numbers.

In this embodiment, the signal pair includes a positive signal and a negative signal. The positive signal is an electrical signal having the positive value $x^+$ as a signal value and is input into the positive signal line 1a. The negative signal is an electrical signal having the absolute value $|x^-|$ of the negative value $x^-$ as a signal value and is input into the negative signal line 1b. Thus, both the positive and negative signals included in the signal pair become electrical signals representing positive real numbers.

As described above, in this embodiment, the input value x represented by the signal pair is the difference between the signal value (positive value $x^+$) of the positive signal input into the positive signal line 1a and the signal value (negative value $x^-$) of the negative signal input into the negative signal line 1b. In other words, the positive signal and the negative signal (signal pair) are generated such that the value obtained by subtracting the signal value of the negative signal from the signal value of the positive signal is the input value x. Specific waveforms and the like of the signal pair will be described in detail later with reference to FIG. 2.

As shown in FIG. 1, the plurality of signal line pairs P1 are connected to one analog circuit 3. The signal line pair P1 that transmits a signal pair to the analog circuit 3 is an input signal line pair (pair of input signal lines), into which a signal pair is input, for the analog circuit 3 to which that signal line pair P1 is connected. Moreover, the signal line pair P1 that transmits a signal pair output from the analog circuit 3 is an output signal line pair (pair of output signal lines), from which a signal pair is output, for the analog circuit 3 to which that signal line pair P1 is connected. In this embodiment, the input signal line pair corresponds to an input line pair.

The plurality of input units 2 each generates a signal pair corresponding to a value (input value x) of input data 4. The input data 4 is, for example, data to be processed using a neural network or the like implemented by the arithmetic apparatus 100. Therefore, it can also be said that the respective signal values of the plurality of electrical signals corresponding to the input data 4 are input values to the arithmetic apparatus 100. Moreover, it can also be said that the signal pair is an input pair.

For example, arbitrary data such as image data, audio data, and statistical data to be processed by the arithmetic apparatus 100 is used as the input data 4. For example, in a case where image data is used as the input data 4, a signal pair corresponding to a pixel value (RGB value, luminance value, etc.) of each of pixels of the image data as a signal value is generated. In addition, a signal pair corresponding to the input data 4 may be generated as appropriate in accordance with the type of the input data 4 and the contents of the processing performed by the arithmetic apparatus 100.

The analog circuit 3 is an analog-type circuit that performs a multiply-accumulate operation on the basis of a plurality of input signal pairs. The multiply-accumulate operation is, for example, an operation of adding up a plurality of product values obtained by multiplying a plurality of input values by weight values corresponding to input values. Therefore, it can also be said that the multiply-accumulate operation is processing of calculating a sum of the product values (hereinafter, referred to as a multiply-accumulate result). In this embodiment, the analog circuit 3 corresponds to a multiply-accumulate device.

As shown in FIG. 1, a plurality of input signal line pairs is connected to one analog circuit 3 and a plurality of signal pairs is provided thereto. The plurality of input signal line pairs and the analog circuit 3 constitute a multiply-accumulate operation circuit according to this embodiment. Moreover, a plurality of signal pairs is input from each of the input signal line pairs, and a multiply-accumulate method according to this embodiment is accordingly performed by the multiply-accumulate operation circuit (analog circuit 3).

Hereinafter, it is assumed that the total number of signal pairs (input signal line pairs) input into one analog circuit 3 is N. In this case, the total number of the input signal lines connected to the analog circuit 3 is 2×N. It should be noted that the number N of signal pairs input into each analog circuit 3 is set as appropriate for each circuit in accordance with, for example, the model, accuracy, and the like of arithmetic processing.

In the analog circuit 3, for example, a $w_1{}^*x_1$ is calculated which is a product value of an input value $x_i$ represented by a signal pair input from an i-th input signal line pair and a weight value $w_i$ corresponding to the input value $x_i$. Here, i represents a natural number equal to or smaller than N (i=1, N).

In the multiply-accumulate operation using the signal pair, each of the signal value of the positive signal input into the positive signal line 1a (positive value $x_1{}^+$) and the signal value of the negative signal input into the negative signal line 1a (negative value $x_i{}^-$) is multiplied by the corresponding weight value and two product values are determined. The two product values can be used for representing the product value $w_i{}^*x_i$ of the input value $x_i$ and the weight value $w_i$. Hereinafter, this point will be described in detail.

The operation of the product value $w_i{}^*x_i$ is performed for each signal pair (input signal line pair) and N product values are calculated. A value obtained by adding up the N product values $w_i{}^*x_i$ is calculated as a multiply-accumulate result (sum of N product values). Therefore, the multiply-accumulate result calculated by one analog circuit 3 is expressed by the following expression.

$$\sum_{i=1}^{N} W_i \cdot X_i \qquad \text{[Formula 1]}$$

The weight value $w_i$ is set, for example, in the range of $-\alpha \le w_i \le +\alpha$. Here, $\alpha$ represents an arbitrary real value. Thus, the weight value $w_i$ may include a positive weight value $w_i$, a negative weight value $w_i$, a zero weight value $w_i$, and the like. By setting the weight value $w_i$ to be in a predetermined range as described above, it is possible to avoid the situation where the multiply-accumulate result diverges.

Moreover, for example, the range in which the weight value $w_i$ is set may be normalized. In this case, the weight value $w_i$ is set to be in a range of $-1 \le w_i \le 1$. Accordingly, for example, the maximum value, the minimum value, and the like of the multiply-accumulate result can be adjusted, and the multiply-accumulate operation can be performed with a desired accuracy.

In a neural network or the like, a method called binary connect, which sets the weight value $w_i$ to be either $+\alpha$ or $-\alpha$, can be used. The binary connect is used in various fields such as image recognition using a deep neural network (multi-layer neural network). The use of the binary connect can simplify the setting of the weight value $w_i$ without deteriorating the recognition accuracy and the like. In the binary connect, the positive weight value and the absolute value of the negative weight value are fixed to the same value.

As described above, in the binary connect, the weight value $w_i$ is binarized into a binary value ($\pm\alpha$). Thus, a desired weight value $w_i$ can be easily set by changing the weight value $w_i$ to be positive or negative, for example. Alternatively, the binarized weight value $w_i$ may be normalized and the weight value $w_i$ may be set to $\pm 1$.

Moreover, the weight value wi may be multivalued. In this case, the weight value wi is set by selecting from a plurality of discrete weight value candidates. Examples of the weight value candidates include (−3, −2, −1, 0, 1, 2, 3) and (1, 2, 5, 10). Moreover, standardized weight value candidates (−1, −0.5, 0, 0.5, 1) or the like may be used. A value is selected from among these weight value candidates and is set as the weight value wi. The number of weight value candidates, the method of setting the candidate values, and the like are not limited. By multivaluing the weight value wi, it is possible to construct a neural network or the like with high versatility, for example.

In addition, the setting range, the setting value, and the like of the weight value $w_i$ are not limited, and may be set as appropriate such that desired processing accuracy is realized, for example.

The input values $x_i$ shown in the expression (Formula 1) are, for example, values of the input data 4 output from the input units 2 and values of multiply-accumulate results output from the analog circuits 3. Thus, it can also be said that the input units 2 and the analog circuits 3 function as signal sources for outputting the input values $x_i$.

As shown in FIG. 1, in this embodiment, a pair of electrical signals (signal pair) corresponding to the input value $x_i$ is output from one signal source (input unit 2, analog circuit 3) via the signal line pair P1. That is, the same signal pair is input into each of the signal line pairs P1 connected to an output side of the one signal source. Moreover, one signal source and the analog circuit 3 into which the electrical signal output from the signal source is input are connected to each other by one signal line pair P1 (input signal line pair).

Therefore, for example, M input signal line pairs are connected to the analog circuit 3 connected to M signal sources in the arithmetic apparatus 100 shown in FIG. 1. In this case, the total number N of signal pairs input into the analog circuits 3 is N=M. It should be noted that the total number of electrical signals input into the analog circuit 3, i.e., the total number of signal lines 1 connected to an input side is 2×M.

As shown in FIG. 1, the arithmetic apparatus 100 has a layered structure in which the plurality of analog circuits 3 is provided in each of a plurality of layers. By configuring the layer structure of the analog circuits 3, a multi-layer perceptron (MLP)-type neural network or the like, for example, is constructed. The number of analog circuits provided in each layer, the number of layers, and the like are designed as appropriate such that desired processing can be performed, for example. Hereinafter, the number of analog circuits 3 provided in a j-th layer may be referred to as $N_j$.

For example, N signal pairs generated by N input units 2 are input into each analog circuit 3 provided in a layer of a first stage (lowest layer). The analog circuits 3 of the first stage calculate multiply-accumulate results related to the input values $x_1$ of the input data, and output the calculated multiply-accumulate results to the analog circuits 3 provided in a next layer (second stage) after the non-linear conversion processing.

$N_1$ signal pairs representing the respective multiply-accumulate results calculated in the first stage are input into the respective analog circuits 3 provided in a second layer (upper layer). Therefore, as viewed from the analog circuits 3 of the second stage, the non-linear conversion processing results of the respective multiply-accumulate results calculated in the first stage are the input values $x_i$ of the signal pairs. The analog circuits 3 of the second stage calculate the multiply-accumulate results of the input values $x_i$ output from the first stage, and output the calculated multiply-accumulate results to the analog circuits 3 of the upper layer.

In this way, in the arithmetic apparatus 100, the multiply-accumulate results of the analog circuits 3 in the upper layer are calculated on the basis of the multiply-accumulate results calculated by the analog circuits 3 in the lower layer. Such processing is performed multiple times, and the processing results are output from the analog circuits 3 included in the top layer (the layer of the third stage in FIG. 1). Accordingly, for example, processing such as image recognition of determining that the object is a cat on the basis of image data (input data 4) obtained by imaging the cat can be performed.

As described above, a desired network circuit can be configured by connecting the plurality of analog circuits 3 as appropriate. The network circuit functions as a data flow processing system that performs arithmetic processing by, for example, causing signals to pass therethrough. In the network circuit, various processing functions can be realized by setting, for example, a weight value (synapse connection) as appropriate. With this network circuit, the multiply-accumulate system according to this embodiment is constructed.

It should be noted that the method of connecting the analog circuits 3 to each other and the like are not limited, and, for example, the plurality of analog circuits 3 may be connected to each other as appropriate such that desired processing can be performed. For example, the present technology can be applied even in a case where the analog circuits 3 are connected to each other so as to configure another structure different from the layered structure.

In the above description, the configuration in which the multiply-accumulate results calculated in the lower layer are input into the upper layer as they are has been described. The present technology is not limited thereto, and, for example, conversion processing or the like may be performed on the multiply-accumulate results. For example, in the neural network model, processing of, for example, performing non-linear conversion on the multiply-accumulate result of each analog circuit 3 by using an activation function and inputting the conversion results to the upper layer is performed.

In the arithmetic apparatus 100, a function circuit 5 or the like that performs non-linear conversion using an activation function on the signal pair, for example, is used. The function circuit 5 is, for example, a circuit that is provided between a lower layer and an upper layer and that converts input values $x_i$ of the input signal pair (signal values of the respective electrical signals) as appropriate and outputs a signal pair according to the conversion result. The function circuit 5 is provided for each of the signal lines 1, for example. The number of function circuits 5, the arrangement of the function circuits 5, and the like are set as appropriate in accordance with, for example, the mathematical model implemented in the arithmetic apparatus 100.

For example, a ReLU function (ramp function) or the like is used as the activation function. The ReLU function outputs the signal pair as it is in a case where the input value $x_i$ represented by the signal pair is 0 or more, for example. Otherwise, the ReLU function outputs a signal pair (pair of electrical signals whose signal values are 0) corresponding to 0. For example, the function circuit 5 that implements the ReLU function is connected to each of the signal line pairs P1 as appropriate. Accordingly, it is possible to realize the processing of the arithmetic apparatus 100.

Figure 2:
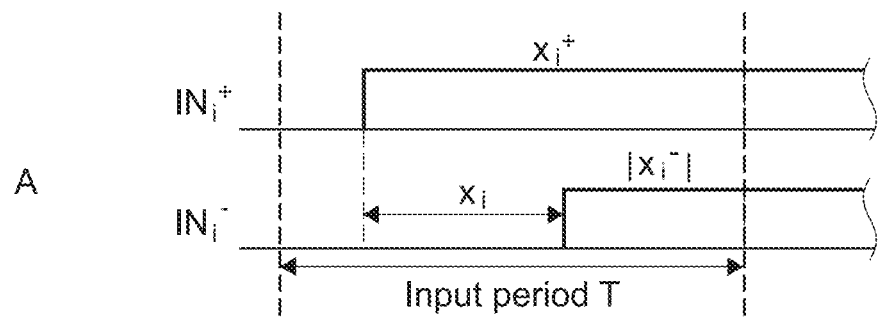
FIG. 2 A schematic diagram showing an example of a signal pair to be input into an analog circuit.
Figure 2:
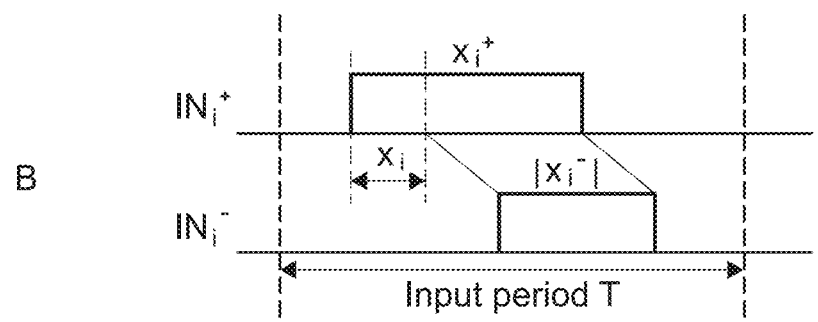

FIG. 2 is a schematic diagram showing an example of the signal pair input into the analog circuit 3. In FIGS. 2A and B, a graph representing a waveform of a pair of electrical signals (signal pair) is schematically shown. In FIG. 2A (FIG. 2B), the upper graph represents a waveform of the electrical signals (positive signal IN$^+$) input into the positive signal line 1a. Moreover, the lower graph represents a waveform of the electrical signals (negative signal IN$^-$) input into the negative signal line 1b. The horizontal axis of the graph indicates the time axis and the vertical axis indicates the voltage of the electrical signal.

In FIG. 2, an exemplary waveform of the electrical signal of a spike timing method (hereinafter, referred to as TACT method) is shown. The TACT method is a method of representing a signal value by using the rising timing of the pulse, for example. For example, a pulse is input at a timing corresponding to the signal value by using a predetermined timing as a reference.

Each electrical signal is input into the analog circuit 3 within the predetermined input period T. The signal value is represented by the input timing of the pulse within this input period T. A pulse input at the same time as the start of the input period T represents a largest signal value. A pulse input at the same time as the end of the input period T represents a smallest signal value.

It can also be said that the signal value is represented by the duration from the input timing of the pulse to the end timing of the input period T. For example, a pulse whose duration from the input timing of the pulse to the end timing of the input period T is equal to the input period T represents the largest signal value. A pulse whose duration from the input timing of the pulse to the end timing of the input period T is 0 represents the smallest signal value.

As shown in FIG. 2A, an i-th signal pair includes a positive signal $IN_i^+$ and a negative signal $IN_i^-$. In the TACT method, the positive signal $IN_i^+$ is an electrical signal whose pulse is input at a timing corresponding to the positive value $x_i^+$ that is its signal value. Moreover, the negative signal $IN_i^-$ is an electrical signal whose pulse is input at a timing corresponding to the absolute value $|x_i^-|$ of the negative value $x_i^-$ that is its signal value.

The input value $x_i$ of the signal pair is represented by the difference between the positive value $x_i^+$ and the absolute value $|x_i^-|$ of the negative value $x_i^-$. Therefore, the input value $x_i$ is a value obtained by subtracting the input timing of the pulse of the negative signal $IN_i^-$ from the input timing of the pulse of the positive signal $IN_i^+$. As described above, in the signal pair according to the TACT method, the input value $x_i$ is represented by the difference between the input timings of the pulses input into the positive and negative signal lines 1a and 1b.

It should be noted that in FIG. 2A, a continuous pulse signal that rises to a timing corresponding to the input value and keeps the ON level until the multiply-accumulate result is obtained is used as electrical signals (positive signal and negative signal) according to the TACT method. The present technology is not limited thereto, and a rectangular pulse or the like having a predetermined pulse width may be used as the electrical signal according to the TACT method.

In a case where the electrical signal according to the TACT method is used, a time-axis analog multiply-accumulate operation using the analog circuit 3 according to the TACT method can be performed.

An exemplary waveform of an electrical signal according to a pulse width modulation (PWM) method is shown in FIG. 2B. The PWM method is, for example, a method of representing the signal value by using a pulse width of the pulse waveform. That is, in the PWM method, the pulse width of the electrical signal is a length corresponding to the signal value. Typically, the longer pulse width represents the larger signal value.

Moreover, the electrical signal is input into the analog circuit 3 within the predetermined input period T. More specifically, the respective electrical signals are input into the analog circuits 3 such that the pulse waveforms of the electrical signals fall within the input period T. Therefore, the maximum value of the pulse width of the electrical signal is similar to the input period T. It should be noted that the timing at which the respective pulse waveforms (electrical signals) are input, and the like are not limited as long as the pulse waveforms fall within the input period T.

In the PWM method, it is possible to normalize the signal value by using the duty ratio R (=τ/T) between the pulse width τ and the input period T, for example. That is, it is expressed as the normalized signal value=the duty ratio R. It should be noted that the method or the like for making the signal value correspond to the pulse width τ is not limited, and for example, the pulse width τ representing the signal value may be set as appropriate such that the operation processing or the like is possible with a desired accuracy.

As shown in FIG. 2B, in the PWM method, the positive signal $IN_i^+$ is an electrical signal having a pulse width corresponding to the positive value $x_i^+$ that is its signal value. Moreover, the negative signal $IN_i^-$ is an electrical signal having a pulse width corresponding to the absolute value of the negative value $x_i^-$ that is its signal value $|x_i^-|$. It should be noted that the timings at which the positive signal $IN_i^+$ and the negative signal $IN_i^-$ are input may be deviated from each other.

Moreover, the input value $x_i$ of the signal pair is a value obtained by subtracting the pulse width of the positive signal $IN_i^+$ from the pulse width of the negative signal $IN_i^-$. Therefore, in the signal pair according to the PWM method, the input value $x_i$ is represented by the difference between the pulse widths of the electrical signals (positive signal $IN_i^+$ and negative signal $IN_i^-$) input into the positive and negative signal lines 1a and 1b.

In a case where the electrical signal according to the PWM method is used, the time-axis analog multiply-accumulate operation using the analog circuit 3 according to the PWM method can be performed.

As illustrated in FIGS. 2A and B, a pulse signal whose ON time duration with respect to the input period T corresponds to the input value can be used as the electrical signal corresponding to the input value. It should be noted that hereinafter, the description will be made assuming that the signal value $x_i$ represented by each electrical signal is a variable of 0 or more and 1 or less.

Figure 3:
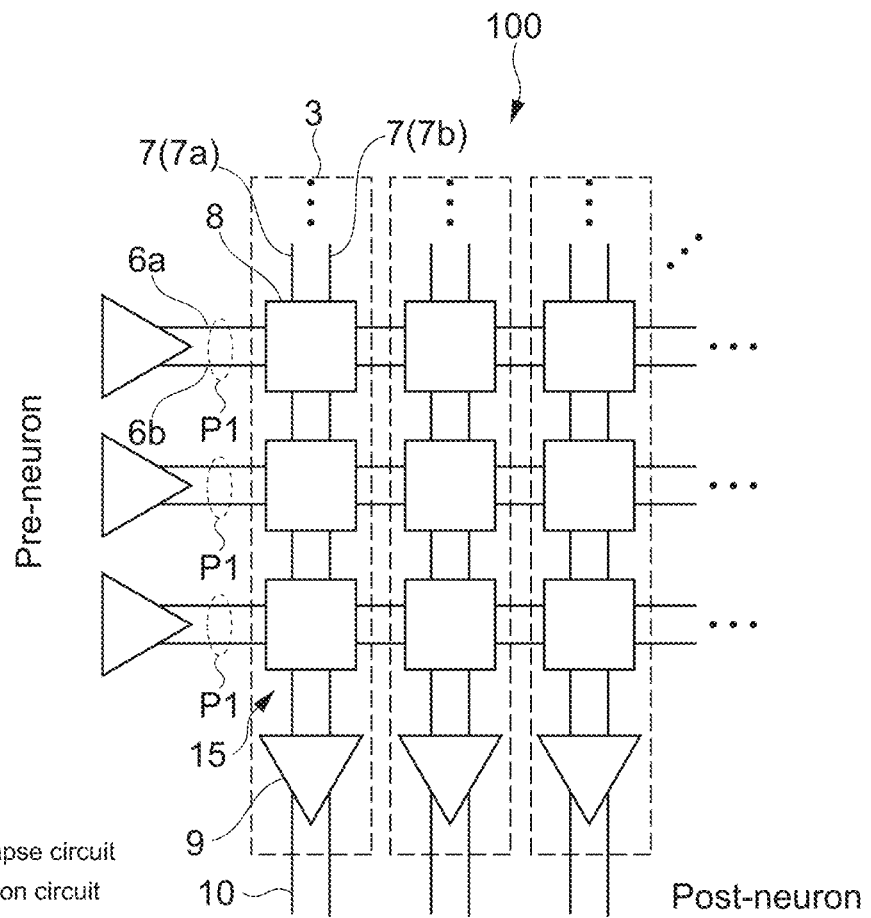
FIG. 3 A schematic diagram showing a specific configuration example of an arithmetic apparatus.

FIG. 3 is a schematic diagram showing a specific configuration example of the arithmetic apparatus 100. FIG. 3 is an arrangement example of circuits for realizing the arithmetic apparatus 100 shown in FIG. 1, for example, and schematically shows the plurality of analog circuits 3 provided in one layer of the arithmetic apparatus 100. A plurality of input signal line pairs P6 is each connected to each analog circuit 3.

The signal pairs corresponding to the input values $x_i$ are input into the plurality of input signal line pairs P6 within the predetermined input period T. For example, the signal pair according to the TACT method or the PWM method described with reference to FIG. 2 is input into each of the input signal line pairs P6 during the input period T.

Each of the input signal line pairs P6 has a positive input signal line 6a and a negative input signal line 6b. The positive input signal line 6a is a signal line 1 into which the positive signal is input and the negative input signal line 6b is a signal line into which the negative signal is input. In this embodiment, the positive input signal line 6a corresponds to a positive input line and the negative input signal line 6b corresponds to a negative input line.

The analog circuits 3 each include a pair of output lines 7, a plurality of synapse circuits 8, and a neuron circuit 9. As shown in FIG. 3, one analog circuit 3 is configured to extend in a predetermined direction (vertical direction in the figure). A plurality of such analog circuits 3 extending in the vertical direction are arranged side by side in the horizontal direction, to thereby form one layer. Hereinafter, it is assumed that the analog circuit 3 disposed on the leftmost side in the figure is a first analog circuit 3. Moreover, the direction in which the analog circuits 3 extend will be sometimes referred to as an extension direction.

The pair of output lines 7 is spaced apart from each other along the extension direction. The pair of output lines 7 includes a positive charge output line 7a and a negative charge output line 7b. Each of the positive charge output line 7a and the negative charge output line 7b is connected to the neuron circuit 9 via the plurality of synapse circuits 8.

The plurality of synapse circuits 8 is arranged corresponding to the plurality of input signal line pairs P6, respectively. One input signal line pair P6 is connected to one synapse circuit 8. The number of synapse circuits 8 provided in one analog circuit 3 is set to be equal to or less than the number of input signal line pairs P6, for example. That is, the synapse circuits 8 do not need to be connected to all the input signal line pairs P6.

In this manner, the plurality of synapse circuits 8 is respectively connected to at least some of the plurality of input signal line pairs P6. The input signal line pair P6 to which the synapse circuit 8 is connected (i.e., the arrangement of the synapse circuit 8) is selected as appropriate by using a mathematical model mounted on the arithmetic apparatus 100, simulation, or the like, for example.

The synapse circuit 8 calculates the product value ($w_i^* x_i$) of the input value $x_i$ represented by the signal pair and the weight value $w_i$. More specifically, the product value ($w_i^* x_i$) is calculated by multiplying each signal value of the positive signal and the negative signal included in the signal pair (the positive value $x_i^+$ and the absolute value $|x_i^-|$ of the negative value $x_i^-$) by the corresponding weight value.

A positive weight value $v_i^+$ and a negative weight value $v_i^-$ are each set to the plurality of synapse circuits 8. Here, the positive weight value $v_i^+$ is a positive real number ($v_i^+ > 0$). Moreover, the negative weight value $v_i^-$ is a negative real number ($v_i^- < 0$). Thus, it can be said that the synapse circuit 8 is a weight pair in which the positive and negative weight values $v_i^+$ and $v_i^-$ are set.

The synapse circuit 8 calculates a product value of a signal value of one electrical signal included in the signal pair and the positive weight value $v_i^+$. Moreover, the synapse circuit 8 calculates a product value of a signal value of the other electrical signal and the negative weight value $v_i^-$. Specifically, the synapse circuit 8 generates a charge (current) corresponding to each product value.

The electrical signal that is a target to be multiplied by the positive weight value $v_i^+$ is set as appropriate for each synapse circuit 8. Moreover, an electrical signal that is not the electrical signal set as the target of the positive weight value $v_i^+$ is a target to be multiplied by the negative weight value $v_i^-$. In the following description, the product value of the positive weight value $v_i^+$ will be referred to as a positive weight product value and the charge corresponding to the positive weight product value will be referred to as a positive weight charge. Moreover, the product value of the negative weight value $v_i^+$ will be referred to as a negative weight product value and the charge corresponding to the negative weight product value will be referred to as a negative weight charge.

As described above, the synapse circuit 8 is capable of generating a positive weight charge corresponding to a positive weight product value obtained by multiplying a signal value of one signal of the signal pair input into the connected input signal line pair P6 by the positive weight value $v_i^+$ and a negative weight charge corresponding to a negative weight product value obtained by multiplying a signal value of the other signal by the negative weight value $v_i^-$.

It should be noted that in the synapse circuit 8, a charge with the same sign (e.g., a positive charge) is output as the charge corresponding to the product value irrespective of whether the weight value $w_i$ is positive or negative. That is, the positive weight charge and the negative weight charge become charges with the same sign. Therefore, it is possible to consider that in the actual circuit, the absolute value |vi⁻| of the negative weight value vi⁻ is multiplied as the negative weight value vi⁻, for example. Since the positive and negative weight values can be handled as the values with the same sign in this manner, the circuit configuration can be simplified.

In this embodiment, the positive weight value $v_i^+$ and the absolute value $|v_i^-|$ of the negative weight value $v_i^-$ are set to be the same value for each of the plurality of synapse circuits 8. Specifically, the positive weight value $v_i^+$ and the absolute value $|v_i^-|$ of the negative weight value $v_i^-$ are both set to be the same value as the absolute value of the weight value $w_i|w_i|$. That is, each weight satisfies the relationship of $|w_i|=v_i^+=|v_i^-|$. Hereinafter, the weight value $w_i$ will be sometimes referred to as a pair weight value $w_i$.

Either a pair weight value $w_i^+$ that is a positive value or a pair weight value $w_i^-$ that is a negative value is set as the pair weight value $w_i$ in the synapse circuit 8. The positive and negative pair weight values $w_i^+$ and $w_i^-$ can be set by associating the signal pair (positive signal and negative signal) with the weight pair (positive weight value) as appropriate. Hereinafter, the synapse circuit 8 in which the positive pair weight value $w_i^+$ is set will be referred to as a positive synapse circuit 8a and the synapse circuit 8 in which the negative pair weight value wi⁻ is set will be referred to as a negative synapse circuit 8b.

The positive synapse circuit 8a generates a positive weight charge by multiplying the signal value $(x_i^+)$ of the positive signal by the positive weight value $v_i^+$ and generates a negative weight charge by multiplying the signal value $(|x_i^-|)$ of the negative signal by the negative weight value $|v_i^-|$. Therefore, the positive weight charge and the negative weight charge are charges corresponding to the positive weight product value $(v_i^+ * x_i^+)$ and the negative weight product value $(|v_i^-| * |x_i^-|)$, respectively.

In this example, a difference $\Delta^+$ between the positive weight product value and the negative weight product value is expressed as follows.

$$\Delta^+ = v_i^+ * x_i^+ - |v_i^-| * |x_i^-| = |w_i|(x_i^+ + x_i^-) = w_i^+ * x_i$$

Thus, the difference $\Delta^+$ is a product value $w_i^+ * x_i$ of the positive pair weight value $w_i^+$ and the input value $x_i$. That is, in the positive synapse circuit 8a, the product value $w_i^+ * x_i$ is calculated as a difference between the positive weight charge and the negative weight charge. In this embodiment, the positive synapse circuit 8a corresponds to a first multiplication unit.

The negative synapse circuit 8b generates a positive weight charge by multiplying the signal value $(|x_i^-|)$ of the negative signal by the positive weight value $v_i^+$ and generates a negative weight value by multiplying the signal value $(x_i^+)$ of the positive signal by the negative weight charge $|v_i|$. Therefore, the positive weight charge and the negative weight charge are charges corresponding to the positive weight product value $(|v_i^-| * x_i^+)$ and the negative weight product value $(v_i^+ * |x_i^-|)$, respectively.

In this example, the difference $\Delta^-$ between the positive weight product value and the negative weight product value is expressed as follows.

$$\Delta^- = |v_i^-| * x_i^+ - v_i^+ * |x_i^-| = -|w_i|(x_i^+ + x_i^-) = w_i^- * x_i$$

Thus, the difference $\Delta^-$ is a product value $w_i^- * x_i$ of the negative pair weight value $w_i^-$ and the input value $x_i$. That is, in the negative synapse circuit 8b, the product value $w_i^- * x_i$ is calculated as the difference between the positive weight charge and the negative weight charge. In this embodiment, the negative synapse circuit 8b corresponds to a second multiplication unit.

It should be noted that the positive weight charge corresponding to the positive weight product value is output to the positive charge output line 7a and the negative weight charge corresponding to the negative weight product value is output to the negative charge output line 7b. Hereinafter, a specific configuration of the synapse circuit 8 will be described in detail.

In this embodiment, the pair of input signal lines 6 (input signal line pair 6P) and the pair of output lines 7 are connected to the single synapse circuit 8. That is, a signal pair is input into the single synapse circuit 8 and a charge corresponding to the product value calculated on the basis of each electrical signal is output to either the output line 7a or 7b in accordance with the sign of the pair weight value $w_i$. Thus, the synapse circuit 8 is a two-input two-output circuit.

In one analog circuit 3, the plurality of synapse circuits 8 is arranged along the pair of output lines 7. Each synapse circuits 8 is connected in parallel to the positive charge output line 7a (negative charge output line 7b). Hereinafter, it is assumed that the synapse circuit 8 disposed on a most downstream side (side connected to the neuron circuit 9) is a first synapse circuit 8.

As shown in FIG. 3, the plurality of input signal line pairs 6 is wired so as to intersect with the pair of output lines 7 of each of the plurality of analog circuits 3. Typically, each input signal line 6 is provided to be orthogonal to each output line 7. That is, the arithmetic apparatus 100 has a crossbar configuration in which the input signal lines 6 and the output lines 7 cross each other. With the crossbar configuration, the analog circuits 3 and the like, for example, can be integrated at high density.

Moreover, in the arithmetic apparatus 100, j-th synapse circuits 8 included in the respective analog circuits 3 are connected in parallel to a j-th input signal line pair P6. Therefore, similar signal pairs are input into the synapse circuits 8 connected to the same input signal line pair P6. Accordingly, a configuration in which one signal source included in the lower layer is connected to a plurality of analog circuits 3 included in the upper layer can be implemented.

It should be noted that in the example shown in FIG. 3, the analog circuit 3 (pre-neuron) included in the lower layer is schematically shown as a signal source that inputs a signal pair into each input signal line pair P6. The present technology is not limited thereto, and, for example, the crossbar configuration can be used also in a case where the input unit 2 is used as the signal source.

As described above, in the arithmetic apparatus 100, the plurality of analog circuits 3 is connected in parallel to each of the plurality of input signal line pairs P6. Accordingly, for example, it is possible to input a signal pair in parallel into each analog circuit 3 (each synapse circuit 8) and to achieve arithmetic processing at high speed. As a result, it is possible to exhibit excellent operation performance.

The neuron circuit 9 calculates a multiply-accumulate result shown in the expression (Formula 1) on the basis of the product values calculated by the synapse circuits 8. Specifically, the neuron circuit 9 outputs an electrical signal representing the multiply-accumulate result (multiply-accumulate signal) on the basis of charges input via the pair of output lines 7.

Figure 4:
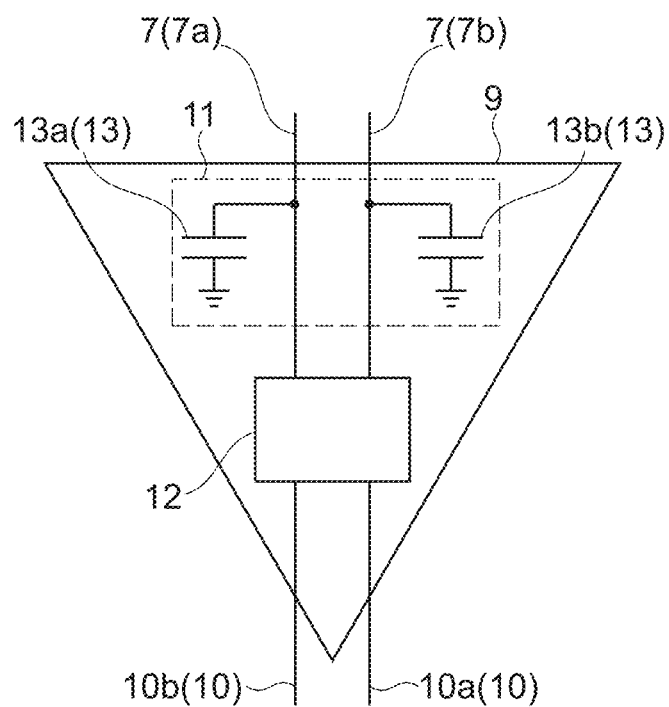
FIG. 4 A schematic diagram showing a configuration example of a neuron circuit.

FIG. 4 is a schematic diagram showing a configuration example of the neuron circuit 9. The neuron circuit 9 includes an accumulation unit 11 and a signal output unit 12. FIG. 4 shows a two-input two-output neuron circuit 9 connected to a pair of output lines 7 and a pair of output signal lines 10 (positive output signal line 10a and negative output signal line 10b). It should be noted that a two-input one-output circuit or the like can be used as the neuron circuit 9 in some cases.

The accumulation unit 11 accumulates charges output to the pair of output lines 7 by the plurality of synapse circuits 8. The accumulation unit 11 includes two capacitors 13a and 13b. The capacitor 13a is connected between the positive charge output line 7a and the GND. Moreover, the capacitor 13b is connected between the negative charge output line 7b and the GND. It should be noted that the capacitors 13a and 13b are set to have the same capacitance.

Therefore, the positive weight charge flowing from the positive charge output line 7a is accumulated in a capacitor 13a. Moreover, the negative weight charge flowing from the negative charge output line 7b is accumulated in a capacitor 13b. In this manner, an accumulation unit 11 is capable of accumulating the positive weight charge and the negative weight charge generated by each of the plurality of synapse circuits 8. In this embodiment, the capacitor 13a corresponds to a positive charge accumulation unit that is connected to the positive charge output line and accumulates the positive weight charge and the capacitor 13b corresponds to a negative charge accumulation unit that is connected to the negative charge output line and accumulates the negative weight charge.

For example, at a timing at which the input period T of the electrical signal ends, the charges accumulated in the capacitor 13a are a sum total of positive weight charges each corresponding to the positive weight product value of the positive weight value $v_i^+$ provided in each synapse circuit 8. Also, the charges accumulated in the capacitor 13b are a sum total of negative weight charges corresponding to the negative weight product value of the negative weight value $v_i^-$ provided in each synapse circuit 8.

For example, in a case where the positive weight charges are accumulated in the capacitor 13a, the potential of the positive charge output line 7a with reference to the GND increases. Therefore, the potential of the positive charge output line 7a is a value depending on the sum total of the positive weight charges each corresponding to the product value of the positive weight value $v_i^+$. It should be noted that the potential of the positive charge output line 7a corresponds to the voltage retained by the capacitor 13a.

Similarly, in a case where the negative weight charges are accumulated in the capacitor 13b, the potential of the negative charge output line 7b with reference to the GND increases. Therefore, the potential of the negative charge output line 7b is a value depending on the sum total of the negative weight charges each corresponding to the product value of the negative weight value $v_i^-$. It should be noted that the potential of the negative charge output line 7b corresponds to the voltage retained by the capacitor 13b.

The signal output unit 12 outputs a multiply-accumulate signal representing a sum of the product values $(w_i^{+*} x_i)$ on the basis of the charges accumulated in the accumulation unit 11. In this embodiment, a positive multiply-accumulate signal representing a sum of the positive weight product values and a negative multiply-accumulate signal representing a sum of the negative weight product values are each output as the multiply-accumulate signal representing the sum of the product values $(w_i^{+*} x_i)$.

Here, the total number of synapse circuits 8 provided in the analog circuit 3 is N. Moreover, the total number of synapse circuits 8 (positive weight pairs) of N synapse circuits 8, in which the positive pair weight value $w_i^+$ is set, is denoted by $N^+$, and the total number of synapse circuits 8 (negative weight pairs) in which the negative pair weight value $w_i^-$ is set is denoted by $N^-$. Thus, $N=N^++N^-$. In this case, the multiply-accumulate result represented by the expression (Formula 1) can be written as follows.

$$\sum_{i=1}^{N} w_i x_i = \sum_{i=1}^{N^+} w_i^+ x_i - \sum_{i=1}^{N^-} |w_i^-| x_i \qquad \text{[Formula 2]}$$

As described above, in a case where signal pairs are used, the input value $x_i$ is represented as differences from $(x_i = x_i^+ - |x_i^-|)$ between the positive value $x_i^+$ and the absolute value $|x_i^-|$ of the negative value $x_i^-$. Thus, the expression (Formula 2) can be rewritten as follows.

$$\sum_{i=1}^{N} w_i \cdot x_i = \left\{ \sum_{i=1}^{N^+} (w_i^+ \cdot x_i^+) + \sum_{i=1}^{N^-} (|w_i^-| \cdot |x_i^-|) \right\} - \left\{ \sum_{i=1}^{N^+} (w_i^+ \cdot |x_i^-|) + \sum_{i=1}^{N^-} (|w_i^-| \cdot x_i^+) \right\} \qquad \text{[Formula 3]}$$

As shown in the expression (Formula 3), the multiply-accumulate result is a value obtained by subtracting the second term from the first term. Here, each of the first term and the second term is a term enclosed by the curly brackets { }.

The first term is a value by summing up the positive weight product values $(w_i^{+*} x_i^+)$ calculated by the synapse circuits 8 in which the positive pair weight value $w_i^+$ is set and the positive weight product values $(|w_i^-|^* |x_i^-|)$ calculated by the synapse circuits 8 in which the negative pair weight value $w_i^-$ is set. That is, the first term is a sum $\sigma^+$ of positive weight product values calculated by all the synapse circuits 8. A sum total of the positive weight product values is represented by a sum of positive weight charges accumulated in the capacitor 13a.

The second term is a value by summing up the negative weight product value $(w_i^{+*} |x_i^-|)$ calculated by the synapse circuit 8 in which the positive pair weight value $w_i^+$ is set and the negative weight product value $(|w_i^-|^* x_i^+)$ calculated by the synapse circuit 8 in which the negative pair weight value $w_i^-$ is set. That is, the second term is a sum $\sigma^-$ of negative weight product values calculated by all the synapse circuits 8. A sum total of the negative weight product values is represented by a sum of negative weight charges accumulated in the capacitor 13b.

In this manner, a total multiply-accumulate result can be calculated as the difference between the sum $\sigma^+$ of the positive weight product values and the sum $\sigma^-$ of the negative weight product values.

It should be noted that the first term (the sum $\sigma^+$ of the positive weight product values) of the expression (Formula 3) does not correspond to the multiply-accumulate result of $N^+$ positive pair weight values $w_i^+$ and the second term (the sum $\sigma^-$ of the negative weight product values) of the expression (Formula 3) does not correspond to the multiply-accumulate result of $N^-$ negative pair weight values $wi^-$.

In the example shown in FIG. 4, the signal output unit 12 calculates a positive multiply-accumulate signal representing the sum of the positive weight product values by referring to the charges accumulated in the capacitor 13a and calculates a negative multiply-accumulate signal representing the sum of the negative weight product values by referring to the charges accumulated in the capacitor 13b.

At a timing at which the input period T ends, the charge corresponding to the sum of the positive weight product value (the sum of the negative weight product value) is accumulated in the capacitor 13a (13b). The same applies to a case where either the TACT method or the PWM method is used.

As it will be described later, in this embodiment, the capacitor 13a and the capacitor 13b are charged when the input period T has elapsed. Charges (current) output from the respective synapse circuits are used for charging each of the capacitors 13a and 13b, for example. In this case, each synapse circuit 8 connected to the plurality of input signal line pairs P6 functions as a charging unit 15 that charges the accumulation unit 11 in which the charge corresponding to the product value is accumulated after the input period T. It should be noted that a dedicated wire (charging unit) or the like for charging each of the capacitors 13a and 13b may be provided.

For example, after the input period T, the charging unit 15 charges each of the capacitor 13a and the capacitor 13b. At this time, the timing at which the potential of the output line to which the capacitor 13a or the capacitor 13b is connected reaches the predetermined threshold potential is detected by using the comparator or the like.

For example, as more charges are accumulated at the start of charging, the timing at which the potential reaches the threshold potential becomes earlier. Therefore, the charges (multiply-accumulate result) accumulated during the input period T can be represented on the basis of the timing. The signal output unit 12 performs threshold determination with respect to each of the capacitors 13a and 13b, generates each of the positive multiply-accumulate signal and the negative multiply-accumulate signal, and outputs it to the pair of output signal lines 10.

In this manner, after the charging unit 15 starts charging, the signal output unit performs the threshold determination using the predetermined threshold value on the voltage retained in the accumulation unit 11, to thereby output a positive multiply-accumulate signal representing a sum of the positive weight product values and a negative multiply-accumulate signal representing a sum of the negative weight product values. In this embodiment, the signal output unit 12 corresponds to an output unit.

Figure 5:
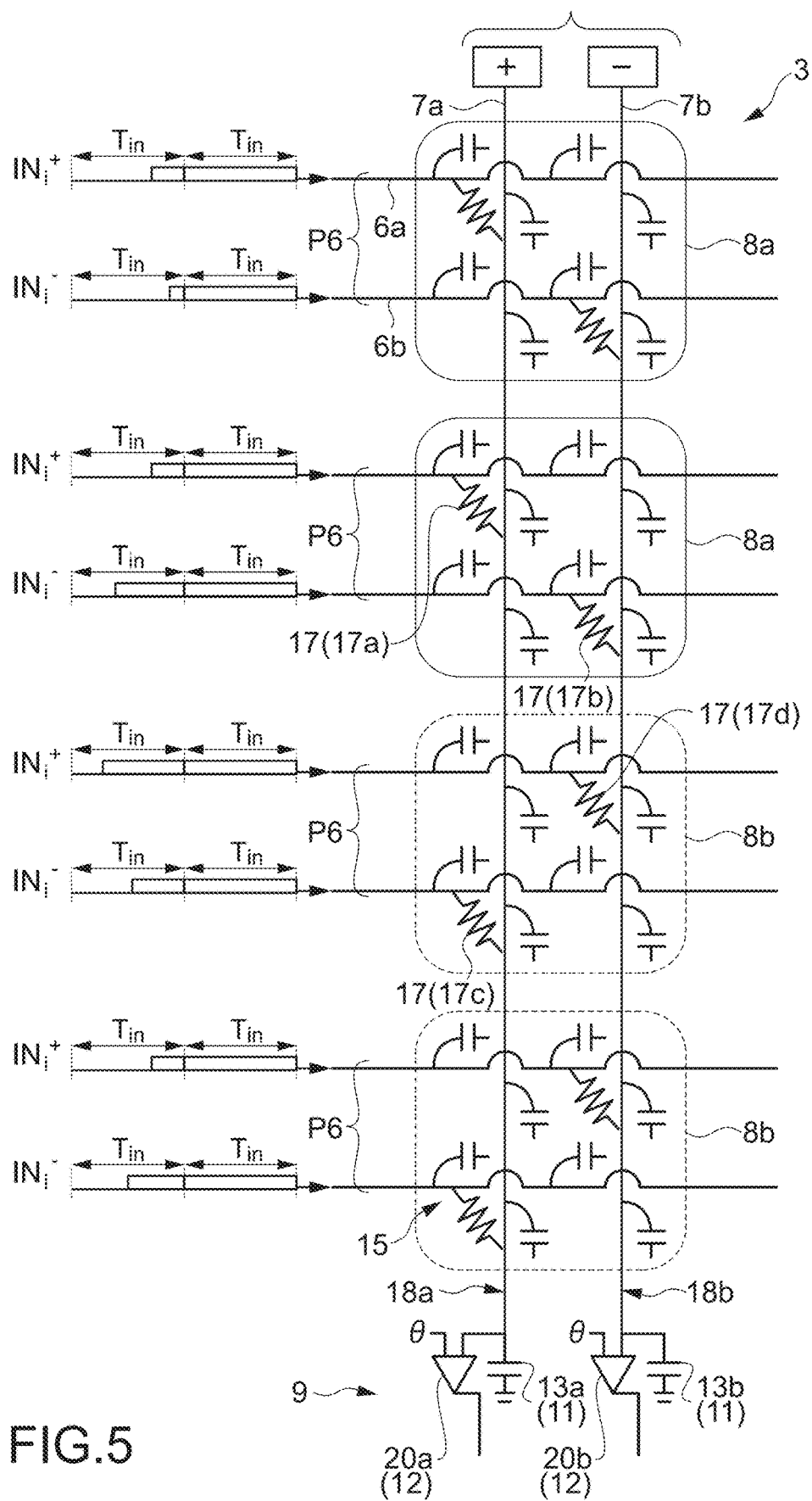
FIG. 5 A schematic circuit diagram showing an example of an analog circuit according to this embodiment.

FIG. 5 is a schematic circuit diagram showing an example of the analog circuit 3 according to this embodiment. The analog circuit 3 is provided extending in a direction orthogonal to the plurality of input signal line pairs P6. That is, in the example shown in FIG. 5, the crossbar configuration is employed.

The analog circuit 3 includes the pair of output lines (positive charge output line 7a and negative charge output line 7b), a plurality of synapse circuits 8, and a neuron circuit 9. The neuron circuit 9 includes the accumulation unit 11, and a signal output unit 12.

In the example shown in FIG. 5, four input signal line pairs P6 are connected to the analog circuit 3. The number of input signal line pairs P6 and the like are not limited. Each signal pair is input into each input signal line pair P6. These signal pairs include signal pairs whose input value $x_i$ is negative or signal pairs whose input value $x_i$ is positive. That is, the positive and negative input values $x_i$ are transmitted by each signal pair. Hereinafter, a pair of signals according to the TACT method will be mainly described.

Figure 6:
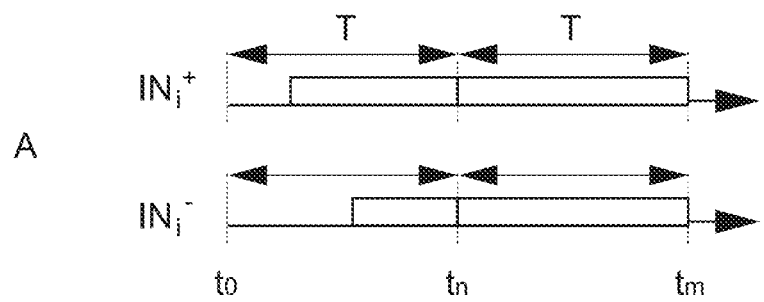
FIG. 6 A schematic diagram showing an example of the signal pair.
Figure 6:
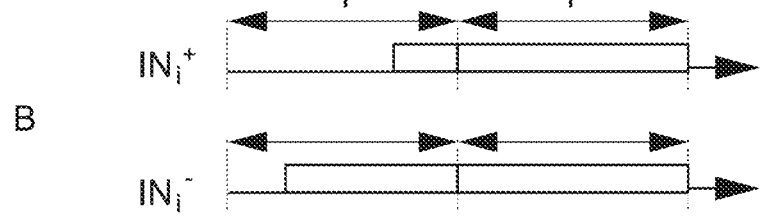

FIG. 6 is a schematic diagram showing an example of the signal pair. FIG. 6A and FIG. 6B schematically show graphs each representing an exemplary waveform of the signal pair according to the TACT method.

In the analog circuit 3, the output period T is set after the input period T. Typically, the output period T is started from the end timing of the input period T. Moreover, the duration of the output period T is set to be equal to the duration of the input period T. Hereinafter, the start timing of the input period T will be denoted by to and the end timing of the input period T will be denoted by $t_n$. Moreover, the end timing of the output period T will be denoted by $t_m$. It should be noted that the end timing $t_n$ of the input period T is the start timing of the output period T.

FIG. 6A is an example of a signal pair (positive signal pair) whose input value $x_i$ is positive. In a case where the input value $x_i$ is positive, the positive value $x_i^+$ that is the signal value of the positive signal $IN_i^+$ is larger than the absolute value $|x_i^-|$ of the negative value $x_i^-$ that is the signal value of the negative signal $IN_i^-$. Hereinafter, it is assumed that in the positive signal pair, the input value $x_i$ can be 0. That is, in the positive signal pair, $x_i^+ \geq |x_i^-|$ is established.

In the positive signal pair according to the TACT method, the input timing $(x_i^+)$ of the pulse of the positive signal $IN_i^+$ is earlier than the input timing $(|x_i^-|)$ of the pulse of the negative signal $IN_i^-$ in the input period T. Thus, the positive signal pair according to the TACT method is defined as a signal pair in which the input timing of the positive signal $IN_i^+ \geq$ the input timing of the negative signal $IN_i^-$ is established.

FIG. 6B is an example of a signal pair (negative signal pair) whose input value $x_i$ is negative. In a case where the input value $x_i$ is negative, the positive value $x_i^+$ which is the signal value of the positive signal $IN_i^+$ is smaller than the absolute value $|x_i^-|$ of the negative value $x_i^-$ that is the signal value of the negative signal $IN_i^-$. That is, in the negative signal pair, $x_i^+ < |x_i^-|$ is established.

In the negative signal pair according to the TACT method, the input timing $(x_i^+)$ of the pulse of the positive signal $IN_i^+$ is slower than the input timing $(|x_i^-|)$ of the pulse of the negative signal $IN_i^-$ in the input period T. Thus, the negative signal pair according to the TACT method is defined as a signal pair in which the input timing of the positive signal $IN_i^+ <$ the input timing of the negative signal $IN_i^-$ is established.

In the example shown in FIG. 5, positive signal pairs are input into first and third input signal line pairs P6 from the top of the figure. Moreover, negative signal pairs are also input into second and fourth input signal line pairs P6. It should be noted that the input signal line pairs P6 into which the positive signal pairs and negative signal pairs are input change in accordance with the input data, for example, in each operation.

Moreover, as shown in FIG. 6A and FIG. 6B, the positive and negative signal pairs are remained in the ON state also after the input period T ends. That is, the respective electrical signals included in the signal pair maintain predetermined signal voltages also after the end timing $t_n$ of the input period T. This ON state is continued, for example, until the end timing $t_m$ of the output period T. The output period T has the same duration as the input period T.

Each electrical signal enters the ON state in the output period T, such that the charge (current) is supplied to the pair of output lines 7 via the synapse circuit 8 (resistor 17). Accordingly, the accumulation unit 11 (the capacitor 13a and the capacitor 13b) is charged during the output period T.

It should be noted that the present technology is not limited to the signal according to the TACT method, and the signal according to the PWM method (see 2B in FIG. 3) may be used. In this case, even in the case where the electrical signals are input such that the electrical signals having the respective pulse widths are input in the input period T and all the input signal lines 6 are held in the ON state in the output period T, a charge corresponding to the multiply-accumulate result can be accumulated in the input period T and the capacitor 13 can be thereafter charged.

Referring back to FIG. 5, the positive charge output line 7a is connected to each synapse circuit 8 and outputs the positive weight charge corresponding to the positive weight product value obtained by multiplying the signal value of either the positive signal or the negative signal by the positive weight value $v_i^+$. Similarly, the negative charge output line 7b is connected to each synapse circuit 8 and outputs the negative weight charge corresponding to the negative weight product value obtained by multiplying the signal value of either the positive signal or the negative signal by the absolute value $|v_i^-|$ of the negative weight value $v_i^-$.

The plurality of synapse circuits 8 is provided to be associated with the plurality of input signal line pairs P6, respectively. In the example shown in FIG. 5, four synapse circuits 8 are provided for the four input signal line pairs P6.

Each synapse circuit 8 is provided with two resistors 17. The two resistors 17 each function as a weight for multiplying the weight value. Thus, the synapse circuit 8 is a weight pair that multiplies the signal pair by the weight value.

It should be noted that FIG. 5 schematically shows a parasitic capacitance derived from each input signal line 6 and a parasitic capacitance derived from each output line 7, and each parasitic capacitance is, for example, an electric capacitance generated between each wire and the GND or the like.

The plurality of synapse circuits 8 includes at least one of the positive synapse circuit 8a and the negative synapse circuit 8b. Therefore, the synapse circuits 8 provided in one analog circuit 3 may be all positive synapse circuits 8a or may be all negative synapse circuits 8b. As a matter of course, the analog circuit 3 including both the positive and negative synapse circuits 8a and 8b may be configured. In the example shown in FIG. 5, first and second positive synapse circuits 8a from the top are provided and third and fourth negative synapse circuits 8b from the top are provided.

Figure 7:
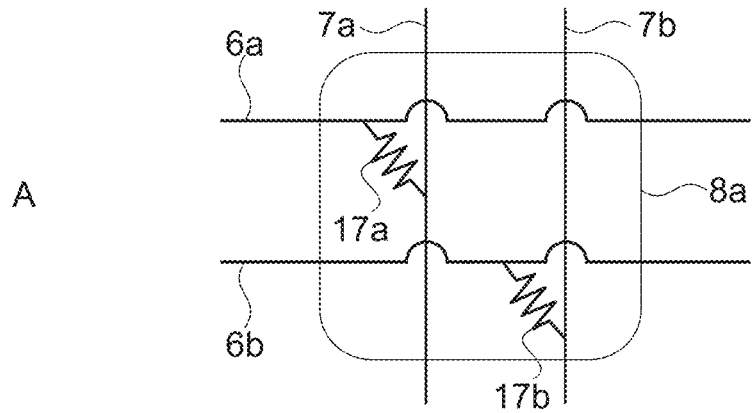
FIG. 7 A schematic circuit diagram showing a configuration example of a synapse circuit.
Figure 7:
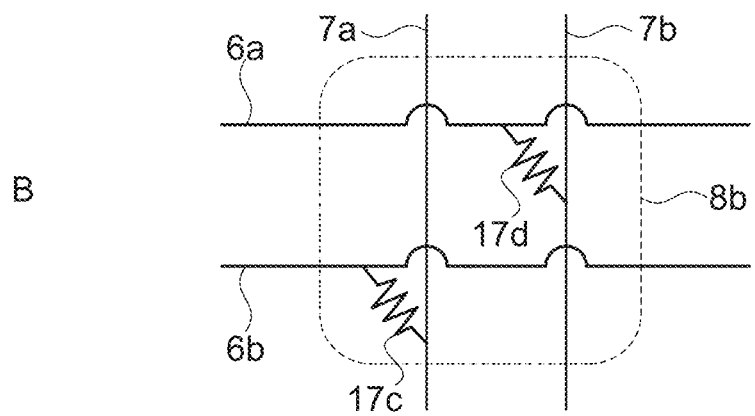

FIG. 7 is a schematic circuit diagram showing a configuration example of the synapse circuit 8. FIG. 7A and FIG. 7B schematically show circuit diagrams of the positive synapse circuit 8a and the negative synapse circuit 8b. It should be noted that the illustrations of the parasitic capacitances are omitted from FIG. 7.

The positive synapse circuit 8a is a synapse circuit 8 in which a positive pair weight value $w_i^+$ is set, and is a positive weight pair. As shown in FIG. 7A, the positive synapse circuit 8a includes a first resistor 17a and a second resistor 17b.

The first resistor 17a is connected between the positive input signal line 6a and the positive charge output line 7a, defines the positive weight $v_i^+$, and outputs the positive weight charge to the positive charge output line 7a. For example, the positive signal input into the positive input signal line 6a is output as the positive weight charge to the positive charge output line 7a through the first resistor 17a. The first resistor 17a functions as a positive weight that generates the positive weight charge.

The second resistor 17b is connected between the negative input signal line 6b and the negative charge output line 7b, defines the negative weight $v_i^-$, and outputs the negative weight charge to the negative charge output line 7b. For example, the negative signal input into the negative input signal line 6b is output as the negative weight charge to the negative charge output line 7b through the first resistor 17b. The second resistor 17b functions as a negative weight that generates the positive weight charge.

Thus, for multiplying the signal value $x_i$ of the signal pair by the positive pair weight value $w_i^+$, the positive input signal line 6a and the positive charge output line 7a are connected to each other via the resistor and the negative input signal line 6b and the negative charge output line 7b are connected to each other via the resistor. Thus, it can be said that in the positive synapse circuit 8a (positive weight pair), the positive signal (positive input) corresponds to the positive weight and the negative signal (negative input) corresponds to the negative weight.

The negative synapse circuit 8b is a synapse circuit 8 in which a negative pair weight value $wi^-$ is set and is a negative weight pair. As shown in FIG. 7B, the negative synapse circuit 8b includes a third resistor 17c and a fourth resistor 17d.

The third resistor 17c is connected between the negative input signal line 6b and the positive charge output line 7a, defines the positive weight $v_i^+$, and outputs the positive weight charge to the positive charge output line 7a. For example, the negative signal input into the negative input signal line 6b is output as the positive weight charge to the positive charge output line 7a through the third resistor 17c. The third resistor 17c functions as a positive weight that generates the positive weight charge.

The fourth resistor 17d is connected between the positive input signal line 6a and the negative charge output line 7b, defines the negative weight $v_i^-$, and outputs the negative weight charge to the negative charge output line 7b. For example, the positive signal input into the positive input signal line 6a is output as the negative weight charge to the negative charge output line 7b through the fourth resistor 17d. The fourth resistor 17d functions as a negative weight that generates the positive weight charge.

Thus, for multiplying the signal value $x_i$ of the signal pair by the negative pair weight value $w_i^-$, the negative input signal line 6b and the positive charge output line 7a are connected to each other via the resistor and the positive input signal line 6a and the negative charge output line 7b are connected to each other via the resistor. Thus, it can be said that in the negative synapse circuit 8b (negative weight pair), the positive signal (positive input) corresponds to the negative weight and the negative signal (negative input) corresponds to the positive weight.

In this embodiment, the resistors 17 serving as positive and negative weights are set to have the same conductance (or resistance value) in one synapse circuit 8. This common conductance is set as appropriate in accordance with the magnitude of the pair weight value $w_i$ set in the synapse circuit 8, for example. For example, in a case where a constant voltage is applied to the resistor 17, the current (charge) generated by the resistor 17 is proportional to the conductance (inversely proportional to the resistance value). Thus, for example, the conductance of the resistor 17 is set to be proportional to the weight value set in the resistor 17.

Accordingly, it is possible to make the magnitudes of the positive weight value and the negative weight value equal and to properly perform the multiply-accumulate operation. It should be noted that the resistance value may be different or may be the same for each synapse circuit 8.

For example, a fixed resistor element, a variable resistor element, a MOS transistor that operates in a sub-threshold region, or the like is used as the resistor 17 (17a to 17d or the like). By using a MOS transistor that operates in the sub-threshold region as the resistor 17, for example, it is possible to reduce the power consumption. As a matter of course, another arbitrary resistor may be used. Moreover, the resistor 17 may have non-linear characteristics or may have a reverse current blocking function.

The accumulation unit 11 accumulates each of the positive weight charge and the negative weight charge generated by each synapse circuit 8 in the input period T. Therefore, it can also be said that the accumulation unit 11 performs an operation of adding the positive weight product values and an operation of adding the negative weight product values. The accumulation unit 11 includes the capacitor 13a and the capacitor 13b.

The capacitor 13a is connected between the positive charge output line 7a and the GND. The positive weight charge generated by the positive weight (the first resistor 17a or the third resistor 17c) of each synapse circuit 8 is accumulated in the capacitor 13a. The capacitor 13b is connected between the negative charge output line 7b and the GND. The negative weight charge generated by the negative weight (the second resistor 17b or the fourth resistor 17d) of each synapse circuit 8 is accumulated in the capacitor 13b.

Moreover, when the input period T ends and the output period T is started, the capacitors 13a and 13b are charged by the charging unit 15 (the plurality of synapse circuits 8). Therefore, the voltage retained by each of the capacitors 13a and 13b increases continuously during the output period T.

The signal output unit 12 performs threshold determination on the voltage of the charged accumulation unit 11 (capacitors 13a and 13b), to thereby output each of the positive multiply-accumulate signal and the negative multiply-accumulate signal. In this embodiment, two comparators 20a and 20b are used as the signal output unit 12.

The comparator 20a detects a timing at which the voltage retained by the capacitor 13a exceeds a predetermined threshold value θ1. It should be noted that the magnitude of the voltage retained by the capacitor 13a is determined by the total amount of positive weight charge accumulated in the capacitor 13a and the charge amount.

The comparator 20b detects a timing at which the voltage retained by the capacitor 13b exceeds a predetermined threshold value θ2. It should be noted that the magnitude of the voltage retained by the capacitor 13b is determined by the total amount of negative weight charge accumulated in the capacitor 13b and the charge amount.

It should be noted that in this embodiment, a multiply-accumulate signal is output by performing threshold determination on each of the capacitors 13a and 13b with the common threshold value θ. That is, θ=θ1=θ2 is set.

Moreover, the comparators 20a and 20b output the positive multiply-accumulate signal and the negative multiply-accumulate signal, respectively, on the basis of the detected timing. For example, an electrical signal that enters the ON state at a timing at which the voltage of the capacitor exceeds the threshold value and then keeps the ON state is generated. Such an electrical signal is output as the positive multiply-accumulate signal or the negative multiply-accumulate signal.

Thus, the comparator 20a outputs the positive multiply-accumulate signal by performing threshold determination using the common threshold value θ on the capacitor 13a. Moreover, the comparator 20b outputs the negative multiply-accumulate signal by performing threshold determination using the common threshold value θ on the capacitor 13b. The predetermined threshold value θ will be described in detail later.

As shown in FIG. 5, the positive weight (first resistor 17a) of the positive synapse circuit 8a and the positive weight (third resistor 17c) of the negative synapse circuit 8b are connected in parallel to the capacitor 13a. The positive weight of each synapse circuit 8 constitutes a positive weight row 18a. Moreover, the negative weight (second resistor 17b) of the positive synapse circuit 8a and the negative weight (fourth resistor 17d) of the negative synapse circuit 8b are connected in parallel to the capacitor 13b. The negative weight of each synapse circuit 8 constitutes a negative weight row 18b. Moreover, the circuit including one weight row 18 and the capacitors 13 and the comparator 20 connected to the weight row 18 functions as a multiply-accumulate deriving means for deriving the multiply-accumulate result.

For example, it is assumed that N synapse circuits 8 are provided in the analog circuit 3. In this case, N positive weights (negative weights) are connected to the capacitor 13a (capacitor 13b) as a positive weight row 18a (negative weight row 18b). Thus, in this configuration, the same number of weights as the synapse circuit 8 (resistor 17) is connected in parallel to each capacitor.

Moreover, in each synapse circuit 8, the magnitudes of the positive and negative weight values ($v_i^+$ and $|v_i^-|$) are set to be equal to each other. Therefore, a sum total value of the positive weight values included in the positive weight row 18a and a sum value of the negative weight values included in the negative weight row 18b are equal to each other. Therefore, the circuit for outputting the positive multiply-accumulate signal and the circuit for outputting the negative multiply-accumulate signal can be considered as circuits having a similar configuration.

Figure 8:
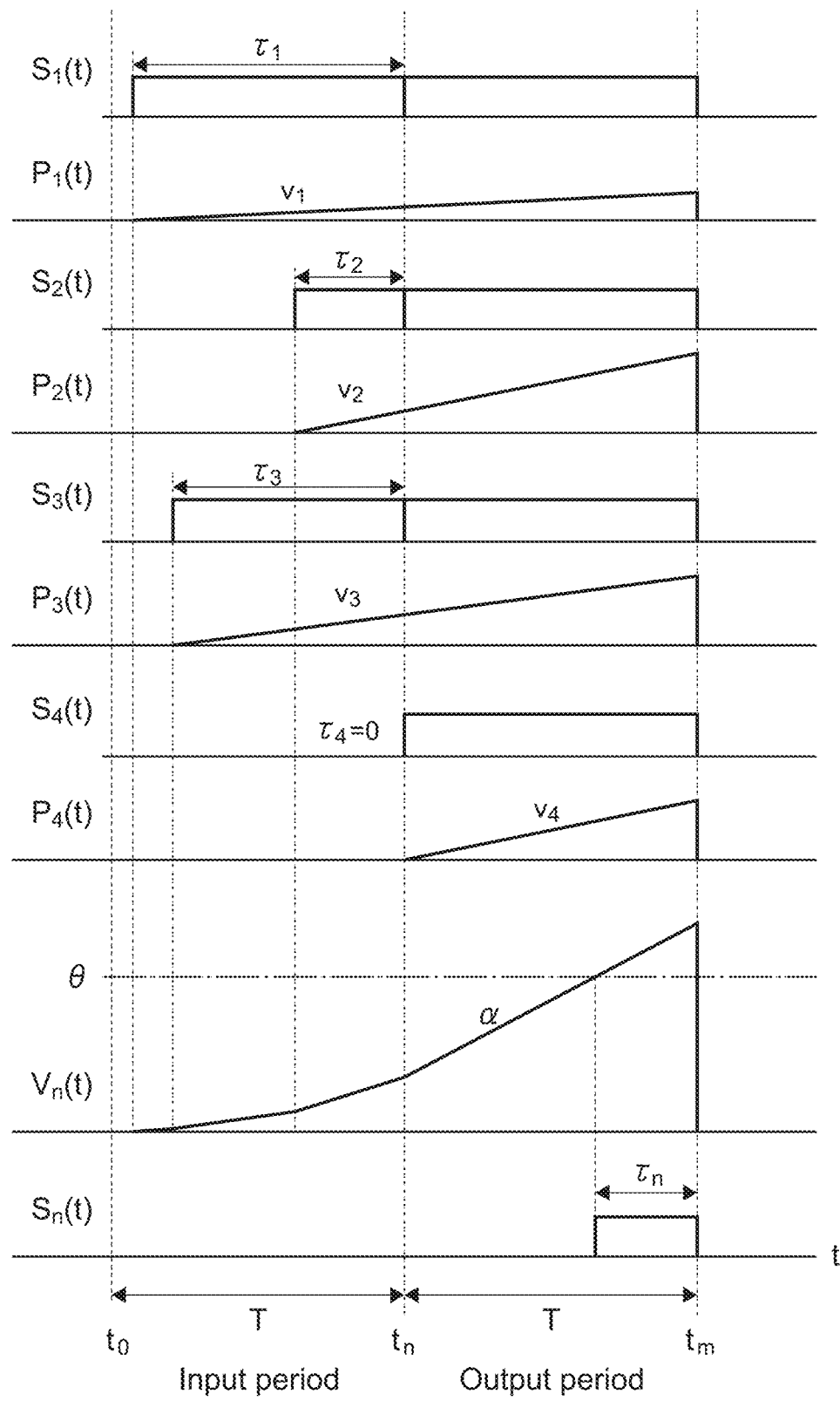
FIG. 8 A diagram for describing a calculation example of a multiply-accumulate signal by the analog circuit shown in FIG. 5.

FIG. 8 is a diagram for describing a calculation example of the multiply-accumulate signal by the analog circuit 3 shown in FIG. 5. In this embodiment, the positive multiply-accumulate signal is output on the basis of the positive weight charges accumulated in the capacitor 13a and the negative multiply-accumulate signal is output on the basis of the negative weight charges accumulated in the capacitor 13b.

As described above, the circuits for outputting the positive and negative multiply-accumulate signals are substantially similar circuits. Therefore, calculation of the positive multiply-accumulate signal (multiply-accumulate result of positive weight charges) and calculation of the negative multiply-accumulate signal (multiply-accumulate result of negative weight charges) are the same processes. FIG. 8 shows a graph showing a calculation example of the multiply-accumulate signal in one weight row 18 (positive weight row 18a or negative weight row 18b).

Hereinafter, a calculation method for the multiply-accumulate result (multiply-accumulate method) based on the charges accumulated in the capacitor 13 will be described with reference to FIG. 8 without discrimination between positive and negative values. It should be noted that in some cases, the positive and negative signals will be both referred to as input signals, the signal values ($x_i^+$ and $|x_i^-|$) that are the positive and negative signals will be both referred to as signal values $y_i$, and the weight values ($v_i^+$ and $|v_i^-|$) that are the positive and negative weights will be both referred to as weight values $v_i$.

"$S_i(t)$" represents an input signal (TACT signal) input into an i-th input signal line pair P6. "$\tau_i$" represents the duration from the input timing of the input signal $S_i(t)$ to the end timing $t_n$ of the input period T. Hereafter, "$\tau_i$" may be referred to as the pulse width of the input signal $S_i(t)$ in the input period T. As "$\tau_i$" becomes larger, the input signal t(t) is a signal representing a larger signal value $y_i$.

"$P_i(t)$" represents an amount of change of an internal state (potential) in each synapse circuit 8 shown in FIG. 5. "$v_i$" represents the weight value of the weight connected to the one weight row (positive weight row or negative weight row) and is defined by the resistance value of the resistor 17 shown in FIG. 5. Here, it is assumed that the potential corresponding to each synapse circuit 8 increases linearly over time. The resistance value of the resistor 17 at this time is, for example, set such that the gradient of the potential is "$v_i$".

For example, regarding $S_1(t)$, the gradient of the potential (weight value $v_1$) is smallest as compared with the others. Therefore, the charge generated per unit time by $S_1(t)$ is smallest. On the other hand, regarding $S_2(t)$, the gradient of the potential (weight value $v_2$) is largest as compared with the others, and the charge generated per unit time is largest. Moreover, $S_4(t)$ is a signal whose pulse width $\tau_4$ is 0 and whose signal value $y_i$ is 0. In this case, the potential of the signal line enters the ON state from the timing $t_n$ at which the input period T ends. Therefore, regarding $S_4(t)$, the supply of charge is started with the start of the output period T and the potential representing the internal state increases in accordance with the weight value $v_4$.

"$\alpha$" represents the gradient of the potential rise of the capacitor 13 in the output period T after the input period T, and is the charging speed of the capacitor 13. In the example shown in FIG. 8, each synapse circuit 8 is maintained at the ON level after the input period T has elapsed, and thus the potential of the capacitor 13 increases at the gradient "$\alpha$". It should be noted that when charging the capacitor 13 through another wire in the output period T, for example, $\alpha$ is a value corresponding to the charging speed. $\theta$ represents a threshold value used for threshold determination performed by the signal output unit 12 (comparator 20).

"$V_n(t)$" represents a sum total of "$P_i(t)$" and corresponds to the total amount of charge accumulated in the capacitor 13. "$S_n(t)$" represents a multiply-accumulate signal (PWM signal) representing the multiply-accumulate result. "$\tau_n$" represents the pulse width of the multiply-accumulate signal to be output. Specifically, "$\tau_n$" represents a value corresponding to the duration from the timing at which the voltage retained by the capacitor 13 exceeds the threshold value $\theta$ in the output period T to the end timing $t_m$ of the output period T.

Here, as shown in the following expression, the signal value $y_i$ of the input signal is given by the duty ratio $R_i$ (=T/T) of the pulse width $\tau_i$ of the input signal $S_i(t)$ in the input period T to the input period T.

$$y_i = R_i\left(=\frac{\tau_i}{T}\right) \quad \text{[Formula 4]}$$

The synapse circuit 8 shown in FIG. 5 generates the charge corresponding to the product value obtained by multiplying the signal value $y_i$ by the weight value $v_i$. Specifically, the resistance of the resistor 17 increases the internal state (potential) at a constant gradient $v_i$.

The amount of change $P_i(t_n)$ of the internal potential of each synapse circuit 8 at the end timing $t_n$ of the input period T is given by the following expression. It should be noted that the high-level value of the input-signal $S_i(t)$ is set to 1.

$$P_i(t) = v_i R_i T = v_i y_i T \quad \text{[Formula 5]}$$

The total amount $V_n(t_n)$ of charge accumulated in the capacitor 13 is a sum total of $Pi(t_n)$, and thus it is given by the following expression.

$$V_n(t_n) = \sum_{i=1}^{N} P_i(t_n) = T\sum_{i=1}^{N} v_i y_i \quad \text{[Formula 6]}$$

In the example shown in FIG. 5, after the end timing $t_n$ of the input period T, all the input signals enter the ON state and the internal state (potential) is increased at the gradient $v_i$ in all the synapse circuits 8. That is, charges are output to the capacitor 13 from all the weights connected to the weight row. The gradient (charging speed $\alpha$) of the voltage of the capacitor 13 at this time is equal to a sum total of the respective "$v_i$". That is, the charging speed $\alpha$ is a sum total value of all the weight values provided in the weight row.

The comparator performs threshold determination on the voltage of the capacitor 13 that increases at the charging speed $\alpha$. A multiply-accumulate signal having a pulse width $T_n$ corresponding to the duration from the timing at which the voltage retained by the capacitor 13 exceeds the threshold value $\theta$ in the output period T to the end timing $t_m$ of the output period T is generated.

Assuming that the duty ratio of the pulse width $\tau_n$ of the multiply-accumulate signal to the output period T is $R_n$ (=$\tau_n$/T), $R_n$ is given by the following expression. It should be noted that the threshold value $\theta$ is equal to or larger than the total amount $V_n(t_n)$ of charge.

$$R_n = \frac{T - \frac{(\theta - V_n(t_n))}{\alpha}}{T} = \frac{1}{\alpha}\sum_{i=1}^{N} v_i y_i + \frac{(\alpha T - \theta)}{\alpha T} \quad \text{[Formula 7]}$$

Therefore, the multiply-accumulate result obtained by adding up product values ($v_i * y_i$) each obtained by multiplying the signal value $y_i$ by the weight value $v_i$ is given by the following expression.

$$\sum_{i=1}^{N} v_i y_i = \alpha R_n - \frac{(\alpha T - \theta)}{T} \qquad \text{[Equation 8]}$$

That is, the multiply-accumulate result is a value obtained by subtracting the constant defined by the charging speed α, the threshold value θ, and the output period T from $\alpha R_n = \alpha \cdot (\tau_n / T)$. In this way, the multiply-accumulate signal representing the multiply-accumulate result for each weight pair can be output on the basis of the timing (pulse width $\tau_n$) at which the voltage retained by the accumulation unit 11 exceeds the threshold value θ in the output period T having the predetermined duration.

In the example shown in FIG. 5, the multiply-accumulate signal representing the multiply-accumulate result shown in the expression (Formula 8) is calculated for each of the positive weight row 18a and the negative weight row 18b. For example, the comparator 20a generates a positive multiply-accumulate signal $S_n^+$ (t) representing the multiply-accumulate result of positive weight charges output from the positive weight row 18a. Moreover, the comparator 20a generates a negative multiply-accumulate signal $S_n^-$ (t) representing the multiply-accumulate result of the negative weight charges output from the negative weight row 18b.

Figure 9:
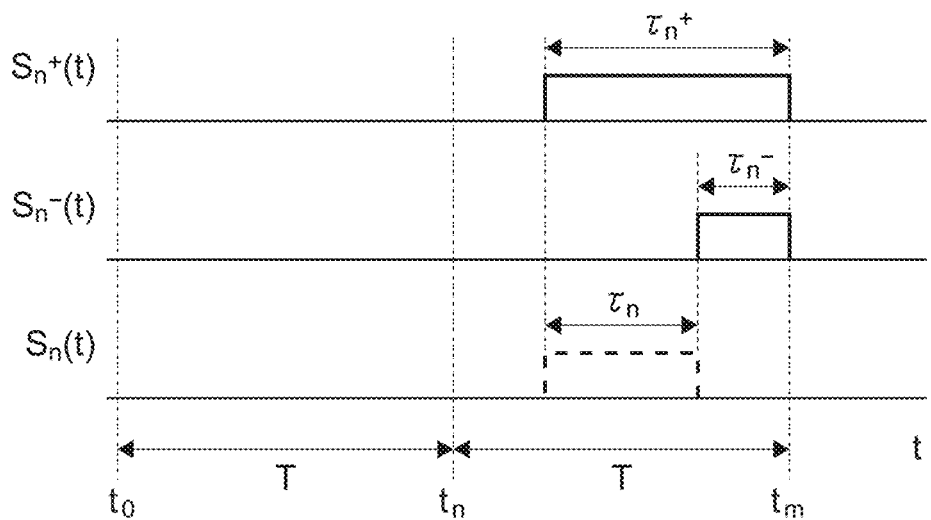
FIG. 9 A schematic diagram showing an example of positive and negative multiply-accumulate signals.

FIG. 9 is a schematic diagram showing an example of the positive and negative multiply-accumulate signals. Hereinafter, the pulse width of the negative multiply-accumulate signal $S_n^+$ (t) will be denoted by "$\tau_n^+$" and the pulse width of the negative multiply-accumulate signal $S_n^+$ (t) will be denoted by "$\tau_n^-$". Moreover, "$S_n(t)$" shown in FIG. 9 is an exemplary multiply-accumulate signal representing a total multiply-accumulate signal including the positive and negative multiply-accumulate signals in the analog circuit 3. The pulse width of $S_n(t)$ will be denoted by "$\tau_n$".

The multiply-accumulate result obtained by adding the product value ($v_i$*$y_i$) in the positive weight row 18a is a sum total of the product values of the positive weights provided in the positive weight pair and the negative weight pair. That is, the multiply-accumulate result of the positive weight row 18a is the sum σ⁺ of the positive weight product values described using the expression (Formula 3). Therefore, in accordance with the expression (Formula 6), a total amount $V_n^+$ ($t_n$) of the positive weight charge accumulated in the capacitor 13a at the end timing $t_n$ of the input period T is given by the following expression.

$$V_n^+(t_n) = T \left\{ \sum_{i=1}^{N^+} (w_i^+ \cdot x_i^+) + \sum_{i=1}^{N^-} (|w_i^-| \cdot |x_i^-|) \right\} = T\sigma^+ \qquad \text{[Equation 9]}$$

As shown in the expression (Formula 9), the sum σ⁺ of the positive weight product values is calculated by associating the positive signals (positive input $x_i^+$) constituting $N^+$ signal pairs with the positive weights constituting the positive weight pairs in the input period T and associating the negative signals (negative input $x_i^-$) constituting $N-N^+=N^-$ signal pairs with the positive weights constituting the negative weight pairs in the input period T.

The multiply-accumulate result obtained by adding the product value ($v_i$*$y_i$) in the negative weight row 18b is a sum total of the product values of the negative weights provided in the positive weight pairs and the negative weight pairs. That is, the multiply-accumulate result of the negative weight row 18b is the sum σ⁻ of the negative weight product values described by using the expression (Formula 3). Therefore, in accordance with the expression (Formula 6), the total amount $V_n^-$ ($t_n$) of the negative weight charge accumulated in the capacity 13b is given by the following expression at the end timing $t_n$ of the input period T.

$$V_n^-(t_n) = T \left\{ \sum_{i=1}^{N^+} (w_i^+ \cdot |x_i^-|) + \sum_{i=1}^{N^-} (|w_i^-| \cdot x_i^+) \right\} = T\sigma^- \qquad \text{[Formula 10]}$$

As shown in the expression (Formula 10), the sum σ⁻ of the negative weight product values is calculated by associating the negative signals (negative input $x_i^-$) constituting $N^+$ signal pairs with the positive weights constituting the positive weight pairs in the input period T and associating the positive signals (positive input $x_i^+$) constituting N-signal pairs with the positive weights constituting the negative weight pairs in the input period T.

It is assumed that the duty ratio of the positive multiply-accumulate signal $S_n^+$ (t) is denoted by $R_n^+$ ($=\tau_n^+/T$) and the sum total of the weight values ($v_i^+$) set in the positive weight row 18a is denoted by $W^+$. In this case, the multiply-accumulate result (the sum σ⁺ of the positive weight product values) calculated by the positive weight row 18a is given by the following expression. It should be noted that it is assumed that the threshold value θ is equal to or larger than the total amount $V_n^+$ ($t_n$) of the positive weight charge).

$$\sigma^+ = W^+ R_n^+ - \frac{(W^+ T - \theta)}{T} \left( W^+ = \sum_{i=1}^{N} v_i^+ \right) \qquad \text{[Formula 11]}$$

It is assumed that the duty ratio of the negative multiply-accumulate signal $S_n^-$ (t) is denoted by $R_n^-$ ($=\tau_n^-/T$) and the sum total of the weight values ($v_i^-$) set in the negative weight row 18b is denoted by $W^-$. In this case, the multiply-accumulate result calculated by the negative weight row 18b (the sum σ⁻ of the negative weight product values) is given by the following expression. It should be noted that the threshold value θ is equal to or larger than the total amount $V_n^-$ ($t_n$) of the negative weight charge and is the same value as θ shown in the expression (Formula 11).

$$\sigma^- = W^- R_n^- - \frac{(W^- T - \theta)}{T} \left( W^- = \sum_{i=1}^{N} |v_i^-| \right) \qquad \text{[Formula 12]}$$

As described above, in the analog circuit 3 configured by using the weight pairs, the sum totals of the weight values ($W^+$ and $W^-$) set to the positive and negative weight rows 18a and 18b are equal to each other. Hereinafter, the sum total value of the weight values set in each weight row will be denoted by W. Thus, in this embodiment, the sum total value $W^+$ of the positive weight values $v_i^+$ and the sum total value $W^-$ of the absolute values $|v_i^-|$ of the negative weight values $v_i^-$ are set to be the same common sum total value W in the analog circuit 3. The sum total value W (common sum total value) of the weight values is equal to a value obtained by adding the sum of the positive pair weights $w_i^+$ and the sum of the negative pair weights $w_i^-$ as shown below.

$$W^+ = W^- = W = \sum_{i=1}^{N^+} w_i^+ + \sum_{i=1}^{N^-} |w_i^-| \quad \text{[Formula 13]}$$

Moreover, the total multiply-accumulate result is expressed by the difference between the sum $\sigma^+$ of the positive weight product values and the sum $\sigma^-$ of the negative weight product values as shown in the expression (Formula 3). Therefore, using the expression (Formula 11), the expression (Formula 12), and the expression (Formula 13), the total multiply-accumulate result is given by the following expression.

$$\sum_{i=1}^{N} w_i \cdot x_i = W(R_n^+ - R_n^-) = W\left(\frac{\tau_n^+ - \tau_n^-}{T}\right) \quad \text{[Formula 14]}$$

That is, the total multiply-accumulate result is obtained by the sum total value W of the weight values, the pulse width $\tau_n^+$ of the positive multiply-accumulate signal $S_n^+$ (t), the pulse width $\tau_n^-$ of the multiply-accumulate signal $S_n^-$ (t), and the output period T. In this manner, it is possible to easily calculate the multiply-accumulate result on the basis of the timing detected by the comparator 20a and the timing detected by the comparator 20b.

Thus, the analog circuit 3 calculates, on the basis of the analog signal, a "sum" of the N product values determined on the basis of the positive and negative electrical signal pairs and the positive and negative weight pairs. Thus, for example, it is possible to properly perform the multiply-accumulate operation irrespective of whether the input value $x_i$ and the weight value $w_i$ are positive or negative.

Moreover, in the analog circuit 3, the positive multiply-accumulate signal $S_n^+$ (t) and the negative multiply-accumulate signal $S_n^-$ (t) are generated, respectively. That is, the pair of electrical signals (signal pair) having the pulse width $\tau_n^+$ and the pulse width $\tau_n^-$ as the signal values is generated. Thus, the input value $x_i$ represented by this signal pair is equal to the pulse width $\tau_n$ corresponding to the total multiply-accumulate result. Thus, the analog circuit 3 is a circuit that outputs the total multiply-accumulate result as the signal pair.

It should be noted that it is also possible to output a single electrical signal representing the total multiply-accumulate result instead of the signal pair. For example, a total multiply-accumulate signal $S_n(t)$ having a difference between the pulse width $\tau_n^+$ and the pulse width $\tau_n^-$ as the pulse width $\tau_n$ is generated. Such a multiply-accumulate signal $S_n(t)$ can be easily configured by using logical circuits such as an AND circuit and a NOT circuit, for example. The total multiply-accumulate signal $S_n(t)$ is used as the output of the uppermost layer (final stage), for example, in the arithmetic apparatus 100.

Figure 10:
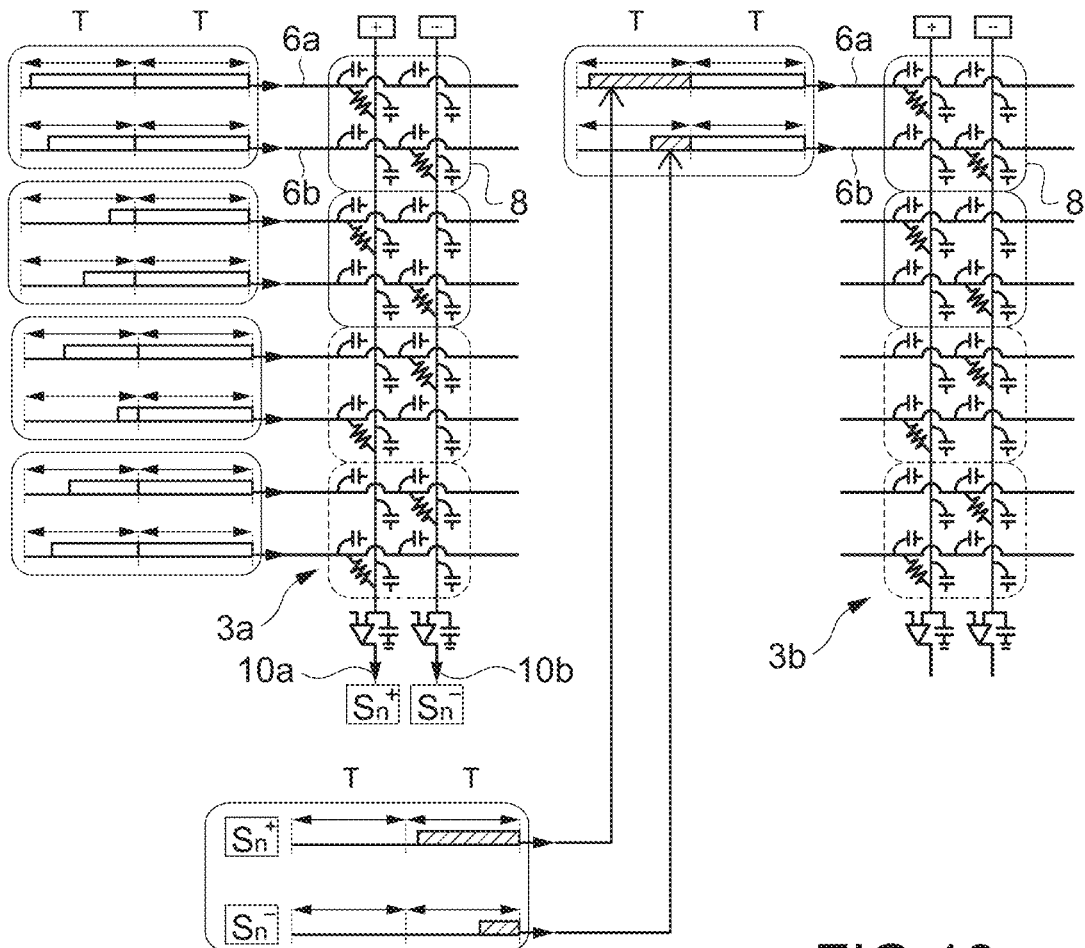
FIG. 10 A schematic diagram showing a connection example between analog circuits of layers.

FIG. 10 is a schematic diagram showing a connection example between the analog circuits 3 of the layers. In FIG. 10, an analog circuit 3a provided in the first layer and an analog circuit 3b provided in the second layer are schematically shown. It should be noted that the second layer is a layer subsequent to the first layer.

For example, a plurality of signal pairs is input into the analog circuit 3a of the first layer in the input period T. The analog circuit 3a generates each of a positive multiply-accumulate signal $S_n^+$ and a negative multiply-accumulate signal $S_n^-$ during the output period T. The positive and negative multiply-accumulate signals $S_n^+$ and $S_n^-$ are a signal pair representing a total multiply-accumulate result of the analog circuit 3a.

In this embodiment, the signal pair ($S_n^+$ and $S_n^-$) generated in the first layer is used as an input signal of the second layer. That is, the signal pair is used as an input into any one of the synapse circuits 8 of the analog circuit 3b. For example, the output of the comparators 20a and 20b of the analog circuit 3a (positive output signal line 10a and negative output signal line 10b) is connected to the positive and negative input signal lines 6a and 6b of either input signal line pair P6 of the analog circuit 3b, respectively.

As shown in FIG. 10, the signal pair ($S_n^+$ and $S_n^-$) generated in the first layer is a signal pair input into the second layer in the input period T. That is, the output period T in the first layer is the input period T in the second layer. It should be noted that a configuration in which $S_n^+$ and $S_n^-$ is stored in an analog memory or the like and the operation time in the second layer is delayed may be employed.

As described above, in the configuration in which the signal pair ($S_n^+$ and $S_n^-$) is output as the multiply-accumulate signal, the signal pair can be used as it is as the input of the next stage. Therefore, for example, the difference (total multiply-accumulate signal) between the positive multiply-accumulate signal $S_n^+$ (t) and the negative multiply-accumulate signal $S_n^-$ (t) is unnecessary, and it is possible to sufficiently simplify the circuit configuration. Moreover, since the circuit for calculating the difference is unnecessary, it is possible to reduce the power consumption of the arithmetic apparatus 100. Thus, it is possible to realize a low arithmetic apparatus 100 of extremely power consumption.

Hereinafter, the charging mode of the charging unit 15 when charging the capacitor 13 will be described.

In this embodiment, in one or more analog circuits 3, the charging by the charging unit 15 is performed on the common charging mode and the common threshold value θ is set as the predetermined threshold value θ. Here, one or more analog circuits 3 are analog circuits 3 connected to a common input signal line pair P6 and are, for example, analog circuits 3 constituting one layer.

The charging of the capacitors 13 in the one or more analog circuits 3 is performed on the basis of a common time constant. That is, the common charging mode includes charging based on the common time constant in the one or more analog circuits 3. Accordingly, it is possible to charge each capacitors 13 in accordance with a similar charging curve, for example. Moreover, a common charge signal or the like is used for this charging. In other words, it can be said that charging using a similar charging method is performed in the one or more analog circuits 3.

Moreover, the threshold determination using the common threshold value θ is performed on the voltage of each capacitor 13 charged on the common charging mode. Therefore, in the arithmetic apparatus 100, the voltage of the capacitor 13 charged on the common charging mode is determined on the basis of the common threshold value θ. Thus, it is possible to output a proper multiply-accumulate result (positive and negative multiply-accumulate signals or the like) from each analog circuit 3.

In this embodiment, the common charging mode includes charging based on a maximum sum total value of a sum total value $W^+$ of the positive weight values $v_i^+$ and a sum total value $W^-$ of the absolute values $|v_i^-|$ of the negative weight values $v_i^-$ which are set in the plurality of synapse circuits 8, which is maximum in the one or more analog circuits 3. For example, a common charging parameter and the like are set on the basis of the maximum value of the sum total value W of the weight values $v_i$ in each analog circuit 3 and each capacitor 13 is charged on the common charging mode.

Moreover, the common threshold value θ is set on the basis of the maximum sum total value. Thus, in the arithmetic apparatus 100, the parameters required to calculate the multiply-accumulate result (the charging parameter, the threshold value θ, and the like) are set on the basis of the maximum sum total value in the one or more analog circuits 3.

For example, as shown in FIG. 3, the plurality of analog circuits 3 is connected to the common input signal line pair P6 in the arithmetic apparatus 100. In this case, the sum total value W (W⁺ or W⁻) of the weight values $v_i$, which is the largest among these analog circuits 3, is the maximum sum total value.

Moreover, for example, the arithmetic apparatus 100 may be configured as an arithmetic module equipped with a single analog circuit 3. In this case, in the analog circuit 3, larger one of the sum total value W⁺ of the positive weight row 18a and the sum total value W⁻ of the negative weight row 18b is the maximum sum total value. It should be noted that as shown in the expression (Formula 13), the case where the sum total values (W⁺ and W⁻) are equal to each other in one analog circuit 3 has been described above. In this case, W⁺ and W⁻ are both the maximum sum total value.

In any case, all the capacitors 13 are charged on the basis of the maximum sum total value among the sum total values W of the weight values $v_i$ of the respective weight rows 18, and the threshold determination is performed on the basis of the threshold value θ set on the basis of the maximum sum total value. Hereinafter, the charging mode of the charging unit 15 and the common threshold value θ will be described in detail. Moreover, the maximum sum total value will be denoted by $W_{max}$.

First, consider the change in voltage of the capacitor 13. For example, in FIG. 8, the change in voltage of the capacitor 13 has been described assuming that the voltage of the capacitor 13 (potential to the GND) linearly increases due to the charge supplied to the capacitor 13.

In an actual circuit, when the charge is supplied to the capacitor 13, the voltage of the capacitor 13 varies in accordance with the voltage curve. The voltage curve is, for example, a curve according to an electric capacitance C of the capacitor 13 and a resistance value (or conductance) of the resistor connected to the capacitor 13. Here, the electric capacitance C corresponds to, for example, a combined capacitance including a parasitic capacitance and the like in the weight row 18 (each synapse circuit 8) to which the capacitor 13 is connected.

For example, it is assumed that the capacitors 13 are charged in the analog circuit 3 shown in FIG. 5. The plurality of input signal lines 6 is connected in parallel to the capacitors 13 via the resistors 17. Therefore, the capacitors 13 accumulate charges in a state in which the plurality of resistors 17 is connected in parallel. When the electrical signal that enters the ON state from the time t=0 to each input signal line 6 is input, the voltage curve V(t) of the capacitor 13 is expressed by the following expression.

$$V(t) = V_{in}\left(1 - e^{-\frac{t}{T_0}}\right) \quad \text{[Formula 15]}$$

Here, $V_{in}$ represents a constant which is the convergence value of the voltage and is typically a voltage value (pulse height) representing the ON state of the input signal. $T_0$ is a time constant of the voltage curve and is a time at which the voltage V(t) reaches about 63% of the convergence value $V_{in}$. The expression (Formula 15) is a function that gradually approaches $V_{in}$ with elapse of time t as shown below.

The time constant $T_0$ is represented as $T_0 = C/w_0$ using a combined capacitance C of the capacitor 13 and a combined conductance $w_0$ of the resistors 17 connected in parallel to the capacitor 13. The combined conductance $w_0$ is, for example, a value according to the sum total value W of the weight values $v_i$. Therefore, the voltage of the capacitor 13 varies in accordance with the sum total value W of the weight values $v_i$. It should be noted that the voltage curve is a charging curve of the capacitor 13 and $T_0$ is a time constant when charging the capacitor 13.

Figure 11:
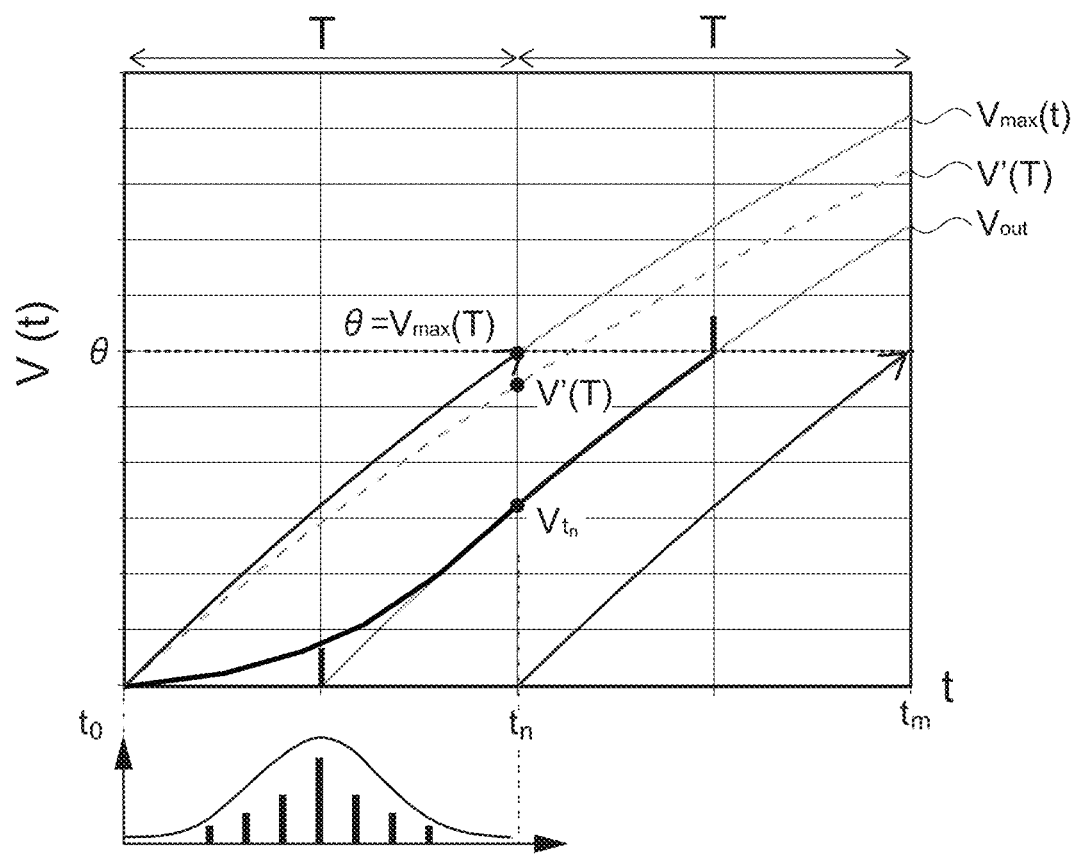
FIG. 11 A schematic graph showing an example of a change in voltage retained by a capacitor over time.

FIG. 11 is a schematic graph showing an example of a change of the voltage retained by the capacitor 13 over time. The horizontal axis of the graph indicates time and the vertical axis indicates the voltage V(t) of the capacitor 13.

In FIG. 11, a maximum voltage curve $V_{max}(t)$ representing the change in voltage of the capacitor 13 in a case where the sum total value W of the weight values $v_i$ is the maximum sum total value $W_{max}$ is shown as the solid gray line. $V_{max}(t)$ is a curve in which the time constant of the expression (Formula 15) is a time constant $T_W$ according to the maximum sum total value $W_{max}$. For example, when the capacitor 13 connected to the weights whose sum total value is $W_{max}$ is charged at the maximum charging speed, the voltage of the capacitor 13 varies in accordance with the maximum voltage curve $V_{max}(t)$.

It can be said that the change in voltage according to $V_{max}(t)$ is a change in voltage in a circuit in which the resistor 17 having the resistance value (conductance) according to the maximum sum total value $W_{max}$ is connected to the capacitor 13 having the electric capacitance C. Therefore, the maximum voltage curve $V_{max}(t)$ is a curve representing a change in voltage of the capacitor 13 over time when the capacitor 13 is charged via the resistor 17 having the resistance value according to the maximum sum total value $W_{max}$. The threshold value θ is set on the basis of this maximum voltage curve $V_{max}(t)$.

In this embodiment, the threshold value θ is set on the basis of the change in voltage of the capacitor 13 that changes in accordance with the maximum voltage curve $V_{max}(t)$ in the input period T. This change in voltage is, for example, a voltage $V_{max}(T)$ when the capacitor 13 is charged at the maximum charging speed for the input period T from a state in which the voltage of the capacitor 13 is 0. Typically, the voltage $V_{max}(T)$ is set as the threshold value θ. Therefore, the threshold value θ is expressed as follows.

$$\theta = V_{in}\left(1 - e^{-\frac{T}{T_W}}\right) \quad \text{[Formula 16]}$$

For example, it is assumed that a maximum pulse whose pulse width in the input period T is maximum is input into all of the input signal lines 6, i.e., the capacitor 13 is charged at the maximum charging speed from t=0. This is a state in which the multiply-accumulate result is maximum. In this case, as shown in FIG. 11, the voltage of the capacitor 13 exceeds the threshold value θ at the end timing $t_n$ of the input period T (start timing $t_n$ of the output period T).

On the other hand, it is assumed that a pulse whose pulse width in the input period T becomes 0 is input into all the input signal lines 6, i.e., the capacitor 13 is charged at the maximum charging speed from t=$t_n$. This is a state in which the multiply-accumulate result is minimum. In this case, the voltage of the capacitor 13 exceeds the threshold value θ at the end timing $t_m$ of the output period T.

In this manner, the maximum multiply-accumulate result and the minimum multiply-accumulate result are detected at the start and end of the output period T. As a result, it is possible to accurately calculate the multiply-accumulate signal with high resolution in the output period T. That is, it is possible to exhibit an advantageous effect by setting the threshold value θ on the basis of the input period T and the maximum sum total value $W_{max}$.

It should be noted that the threshold value θ may be set on the basis of the value on the right side of the expression (Formula 16). For example, in a case where the frequency (ratio) at which the minimum value of the multiply-accumulate result is calculated is low or the like, the threshold value θ may be set to be slightly larger than the value of the expression (Formula 16). Conversely, in a case where the frequency (ratio) at which the maximum value is calculated is low or the like, the threshold value θ may be set to be slightly larger. Accordingly, it is possible to properly detect the multiply-accumulate result even in a case where there is voltage noise or the like.

In the actual operation, it is conceivable that input signals having various pulse widths T shown below are input into the respective resistors 17 (weights) in the input period T (see FIG. 5). In FIG. 11, a histogram showing a distribution of those pulse widths is schematically shown.

In a case where the pulse width T of each input signal is not constant, the voltage of the capacitor 13 does not necessarily rise along the curve corresponding to the maximum voltage curve Vmax(t). In such a case, the voltage of the capacitor 13 in the input period T increases, for example, in accordance with the pulse width τ of each input signal (input timing) (graph of the black solid line in FIG. 11).

Moreover, after the end timing $t_n$ of the input period T, all the input signals enter the ON state and charges are supplied from all the weights, for example. That is, the capacitor 13 is charged at the maximum charging speed. Therefore, irrespective of the pulse width or the like of the input signal, the voltage of the capacitor 13 in the output period T increases along the curve corresponding to Vmax(t). For example, the voltage of the capacitor 13 in the output period T is expressed by the following expression.

$$V_{out} = V_{t_n} + (V_{in} - V_{t_n})\left(1 - e^{-\frac{t}{T_w}}\right) \quad \text{[Formula 17]}$$

$V_{t_n}$ is a voltage of the capacitor 13 at the end timing $t_n$ of the input period T and is a voltage according to the sum total (multiply-accumulate result) of the charges accumulated in the input period T. Accordingly, the expression (Formula 17) represents a change in voltage when the capacitor 13 retaining the voltage $V_{t_n}$ corresponding to the multiply-accumulate result is charged in accordance with $V_{max}(t)$.

Moreover, $V_{t_n}$ results from substituting an average value of the pulse widths τ of the input signals input into the respective weights into the maximum voltage curve $V_{max}(t)$. That is, the voltage retained by the capacitor 13 at the end timing $t_n$ of the input period T is a voltage similar to that in a case where a pulse having a width similar to the average value of the pulse widths τ is input into all the weights.

Thus, the voltage of the capacitor 13 can be determined on the basis of the time constant TW according to the maximum sum total value Wmax and the average value of pulse widths τ of the respective input signals. That is, as shown in FIG. 11, the voltage of the capacitor 13 can be regarded as one that increases along the curve, which corresponds to the maximum voltage curve Vmax(t), from the timing (median of histogram) obtained by subtracting the average value of the pulse widths τ of the respective input signals from the input period T.

In this embodiment, the charging unit 15 is configured such that each capacitor 13 is charged in accordance with the expression (Formula 17). That is, in the output period T, the time constants of the changes in voltage (charging) of the respective capacitors 13 are all the time constant $T_W$ according to the maximum sum total value $W_{max}$. As described above, the common charging mode performed by each analog circuit 3 charges the capacitor 13 in accordance with the time constant $T_W$ according to the maximum sum total value $W_{max}$.

The voltage increasing in accordance with the expression (Formula 17) exceeds the threshold value θ in the output period T. The timing at which it exceeds the threshold value θ is used for generating the multiply-accumulate signal representing the multiply-accumulate result by the capacitor 13. As described above, it can be said that the processing of charging the capacitor 13 in accordance with the expression (Formula 17) and performing the threshold determination using the threshold value θ is processing of converting the voltage $V_{tn}$ normalized with the threshold value θ into a voltage (pulse width) normalized with the period T.

Here, consider the change in voltage of the capacitor 13 connected to the weight row 18 in which the sum total value W of the weight values $v_i$ is smaller than the maximum sum total value $W_{max}$. For example, it is assumed that the capacitor 13 having the capacitance C connected to the weight row 18 where W<$W_{max}$ is charged at the maximum charging speed from the start of the input period T. In this example, the voltage curve V'(t) of the capacitor 13 (gray dotted line in FIG. 11) is a curve with a change in voltage smaller than the maximum voltage curve $V_{max}(t)$.

Therefore, the maximum value V'⁻(T) of the voltage of the capacitor 13 connected to the weight row 18 where W<$W_{max}$ at the end timing $t_n$ of the input period T is smaller than the threshold value θ ($V_{max}(T)$) set using the maximum sum total value $W_{max}$. For this reason, the voltage of the capacitor 13 connected to the weight row 18 where the voltage W<$W_{max}$ does not exceed the threshold value θ in the input period T.

Moreover, V'(T) can be simply considered as the voltage of the capacitor 13 having the electric capacitance C. Therefore, for example, it is possible to convert V'(T) normalized with the threshold value θ into the timing normalized with the period T by charging the capacitor 13 retaining V'(T) in accordance with the curve shown in the expression (Formula 17) and performing the threshold determination using the threshold value θ.

That is, the capacitor 13 connected to the weight row 18 where W<$W_{max}$ is processed on the charging mode common to the capacitor 13 connected to the weight row 18 in which $W_{max}$ is set, such that the multiply-accumulate signals normalized with the same normalization parameters can be generated. Thus, it is possible to accurately align the multiply-accumulate values represented by the multiply-accumulate signals.

It should be noted that even in a case where W<$W_{max}$, it is possible to charge the capacitor 13 in accordance with the expression (Formula 17) and perform the threshold determination using the threshold value θ on the voltage of the capacitor 13. In this case, a current source different from the input signal line 6 and the resistor 17 is used for charging the capacitor 13. This point will be described in detail later with reference to FIGS. 13 and 15 and the like.

By using the time constant $T_W$ and the threshold value θ set on the basis of the maximum sum total value $W_{max}$ in this manner, the multiply-accumulate results can be properly calculated in all the weight rows 18 included in the analog circuits 3 connected to the common input signal line pair P6. For example, the multiply-accumulate result calculated by each analog circuit 3 is a value normalized with the same normalization parameters (the threshold value θ and the output period T).

Accordingly, for example, a plurality of multiply-accumulate results generated in one layer can be output to the next layer as values that can be compared with each other, and a highly accurate analog multiply-accumulate operation can be realized. Moreover, for example, it is possible to supply the threshold value θ to all the analog circuits 3 with a single wire and it is possible to sufficiently simplify the circuit configuration.

FIGS. 12 to 15 are circuit diagrams showing a configuration example of the arithmetic apparatus. Arithmetic apparatuses 200 to 500 shown in FIGS. 12 to 15 each include a plurality of analog circuits 3 connected in parallel to each of the plurality of input signal line pairs P6. Hereinafter, a configuration of the weight pair in the plurality of analog circuits 3 connected in parallel to each other will be specifically described.

Figure 12:
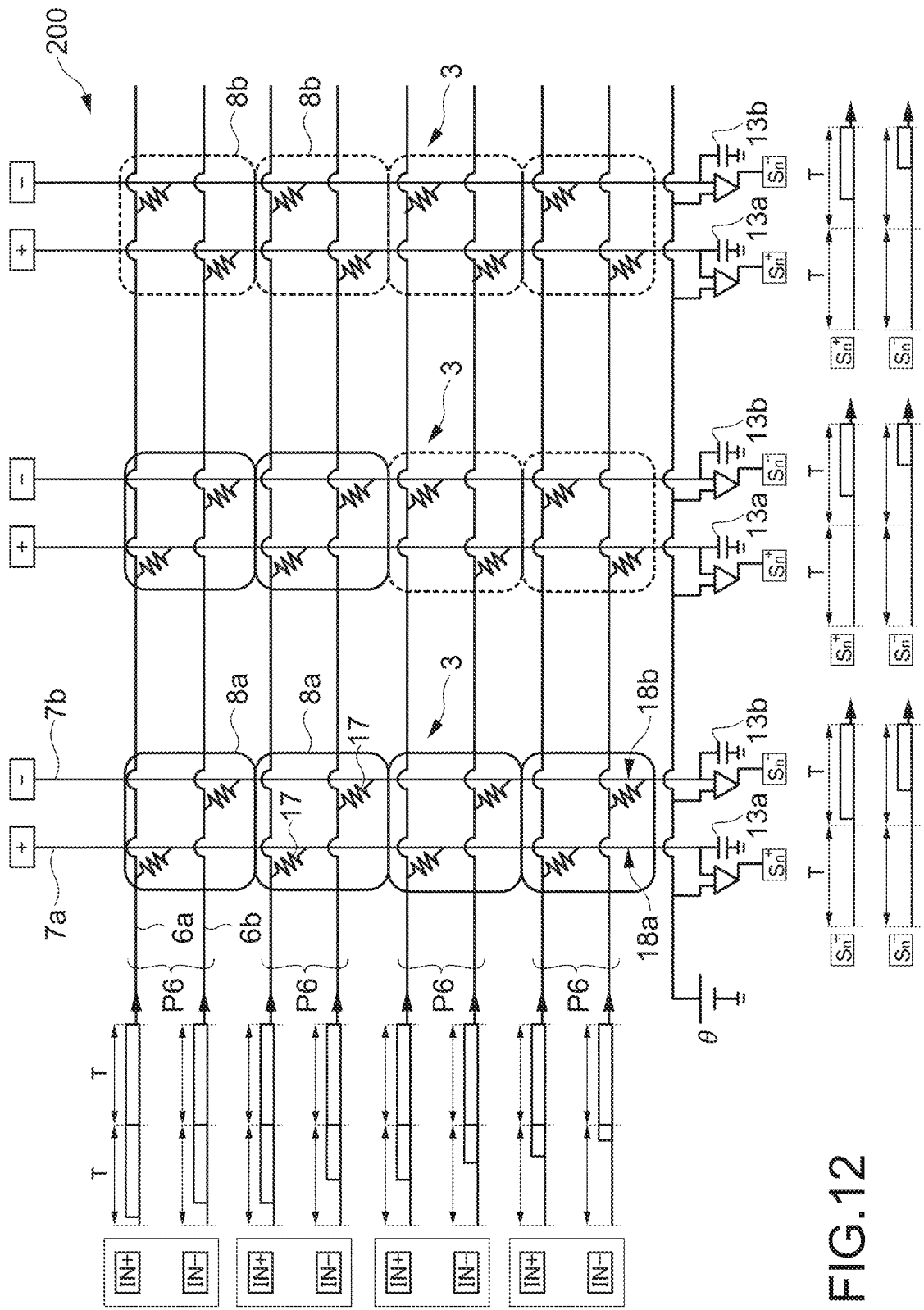
FIG. 12 A circuit diagram showing a configuration example of the arithmetic apparatus.

In the arithmetic apparatus 200 shown in FIG. 12, a binary weight is set and each analog circuit 3 is provided with the same number of synapse circuits 8.

The binary weight is configured to realize, for example, the binary connect and the pair weight value $w_i$ of each synapse circuit 8 is set to either ±w. In this case, the positive and negative weights included in the positive and negative weight pairs (positive and negative synapse circuits 8a and 8b) are both set to be the weight value w. That is, the positive weight value $v_i^+$ and the absolute value $|v_i^-|$ of the negative weight value $v_i^-$ are fixed to the same value. Therefore, $v_i^+=|v_i^-|=w$ is established in all the weight pairs in the arithmetic apparatus 200.

Moreover, in the arithmetic apparatus 200, the number of synapse circuits 8 (weight pairs) included in each analog circuit 3 is set to be the same number. That is, the arithmetic apparatus 200 has a configuration in which the analog circuits 3 including the same number of weight pairs are connected in parallel to the plurality of input signal line pairs P6.

Thus, in the arithmetic apparatus 200, the weight values of the positive weight and the negative weight are equal and the number of synapse circuits 8 included in each analog circuit 3 is equal. Therefore, the common sum total values which are the sum total values W of the weight values $v_i$ are set to be the same value W in the plurality of analog circuits 3 in the arithmetic apparatus 200.

For example, the number of synapse circuits 8 provided in one analog circuit 3 is N. In this case, in each analog circuit 3, the sum total value $W^+$=sum total value $W^-$=W=N×w is established. Thus, in the arithmetic apparatus 200, the sum total values W of the weight values $v_i$ included in the positive and negative weight rows 18a and 18b are all equal. This sum total value W of the weight values $v_i$ common to all the weight rows 18a is the maximum sum total value $W_{max}$.

In the example shown in FIG. 12, four input signal line pairs P6, and three analog circuits 3 are provided. Moreover, each analog circuit 3 includes four synapse circuits 8 respectively connected to the four input signal line pairs P6.

Moreover, in FIG. 12, the left analog circuit 3 is constituted by all positive synapse circuits 8a. In the central analog circuit 3, positive synapse circuits 8a are provided as first and second synapse circuits from the top and negative synapse circuits 8b are provided as third and fourth synapse circuits. The right analog circuit 3 is constituted by all negative synapse circuits 8a. As a matter of course, the number of analog circuits 3, the number of synapse circuits 8, the sign of the pair weight set in the synapse circuit 8, and the like are not limited to the example shown in FIG. 12.

It should be noted that in FIG. 12, an example of a signal pair input into each input signal line pair P6 (positive signal and negative signal) and an example of a signal pair output from each analog circuit 3 (positive multiply-accumulate signal and negative multiply-accumulate signal) are schematically shown.

When the input period T is started, a positive signal and a negative signal (signal pair) corresponding to the positive and negative values ($x_i^+$ and $x_i^-$) representing the input value $x_i$ are input into each input signal line pair P6. For example, the signal pair input into the first input signal line pair P6 from the top is simultaneously input into the first synapse circuits 8 of the left, right, and central analog circuit 3. Similarly, a signal pair input into the corresponding input signal line pair P6 is simultaneously input into the synapse circuits 8 of the respective analog circuit 3.

In the positive synapse circuit 8a (positive weight pair), the positive weight product value of the positive signal and the positive weight is calculated and the negative weight product value of the negative signal and the negative weight is calculated. Moreover, in the negative synapse circuit 8a (negative weight pair), the positive weight product value of the negative signal and the positive weight is calculated and the negative weight product value of the positive signal and the negative weight is calculated. A positive weight charge corresponding to the positive product value is output to the positive charge output line 7a and a negative weight charge corresponding to the negative product value is output to the negative charge output line 7b.

As a result, the positive weight charge and the negative weight charge are simultaneously accumulated in the capacitors 13a and 13b provided in each analog circuit 3 in the input period T. At the end timing $t_n$ of the input period T, the accumulation of the charge corresponding to the sum of the product values is completed, and the voltages of the capacitors 13 become voltages representing the multiply-accumulate results. At this point, the calculation (multiply-accumulate operation processing) of the multiply-accumulate result by the plurality of analog circuits 3 is completed.

As shown in FIG. 12, signals that continuously maintain the ON state also during the output period T as each signal pair (input signals) in the arithmetic apparatus 200. Accordingly, it is possible to charge each capacitor 13 during the output period. Therefore, the signals (voltages) input in the output period T function as common charge signals for charging the capacitors 13. That is, it can also be said that the plurality of input signal line pairs P6 supplies charge signals that enter the ON state after the input period T.

For example, the voltage of each input signal line pair P6 enters the ON state, such that charges are generated by the positive and negative weights (resistors 17) provided in the synapse circuit 8 and are accumulated in the capacitors 13a and 13b through the positive and negative output lines 7, respectively. In this manner, in the arithmetic apparatus 200, the capacitor 13 is charged by accumulating the charges generated by the plurality of synapse circuits 8 on the basis of the charge signals.

As described above, the sum total value W of the weight values $v_i$ included in each weight row 18 is all equal values (maximum sum total value $W_{max}$) in the arithmetic apparatus 200. Therefore, in the output period T, the charging time constant of each capacitor 13 is the time constant $T_W$ that depends on the sum total value W of the weight values $v_i$. Therefore, during the output period T, all the capacitors 13 included in the arithmetic apparatus 200 are charged in accordance with the curve represented by the expression (Formula 17).

Moreover, in the output period T, the threshold determination using the common threshold value θ set on the basis of the maximum sum total value $W_{max}$ is performed on the voltages of the respective capacitors 13 in the output period T. The common threshold value θ is a value set using the expression (Formula 16). Accordingly, in all the weight rows 18, the voltages of the capacitors 13 normalized with the threshold value θ are converted into the timings normalized with the output period T. As a result, it is possible to simultaneously generate a plurality of comparable multiply-accumulate signals. That is, a plurality of multiply-accumulate operations can be performed in parallel and high-speed operation processing can be realized.

Thus, in the arithmetic apparatus 200, the sum total values W of the respective weight value $v_i$ in the respective weight rows 18 are all equal. In this example, the respective capacitors 13 can be charged in accordance with the same time constant $T_W$ by the charge signals supplied from the plurality of pairs of input signal lines P6. In other words, since the sum total values W of the weight values $v_i$ are all equal to each other, the capacitors 13 are charged in accordance with similar voltage curves even if the input signal line pair P6 is used as the source of the charge signal.

Therefore, in the arithmetic apparatus 200, the capacitors 13 can be charged as it is using a wire for inputting the signal pair. Moreover, since the respective capacitors 13 can be charged in accordance with the similar time constant $T_W$, the threshold value θ can be shared. Thus, for example, it is not necessary to provide dedicated wires for charging the capacitors 13, wires for supplying the threshold values θ individually, and the like, and it is possible to sufficiently simplify the circuit configuration.

Figure 13:
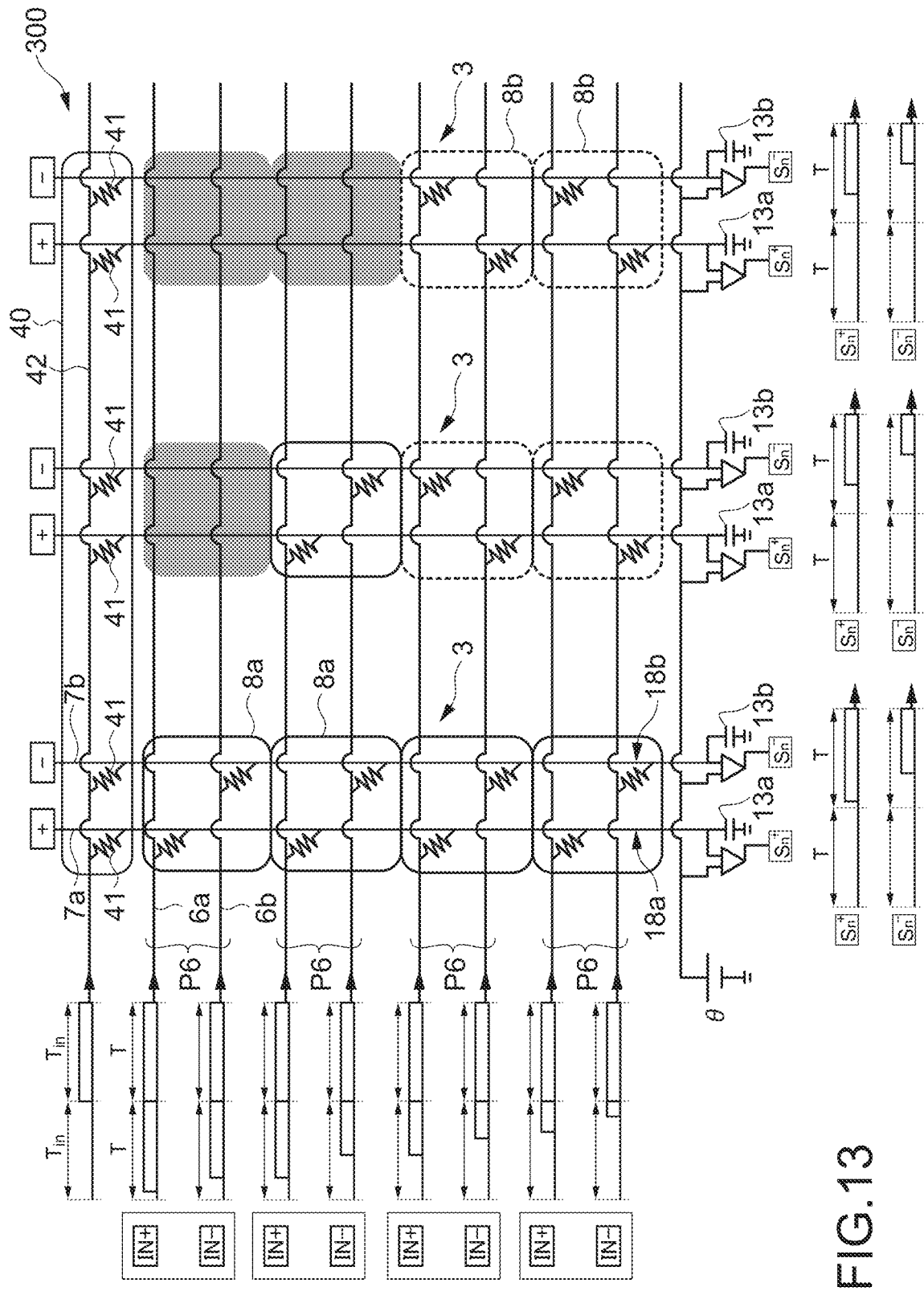
FIG. 13 A circuit diagram showing a configuration example of the arithmetic apparatus.

In the arithmetic apparatus 300 shown in FIG. 13, the binary weight is set and the number of synapse circuits 8 provided in each analog circuit 3 is different.

The arithmetic apparatus 300 includes a plurality of input signal line pairs P6, a plurality of analog circuits 3, and a charging circuit 40. As shown in FIG. 13, in the arithmetic apparatus 300, the number of synapse circuits 8 included in the analog circuit 3 is set for each analog circuit 3. It should be noted that each synapse circuit 8 is set to have the binary weight and $v_i^+ = |v_i^-| = w$ is established in all the synapse circuits 8.

Thus, in the arithmetic apparatus 300, the weight values of the positive weight and the negative weight are equal and the number of synapse circuits 8 included in each analog circuit 3 is different. Therefore, in the arithmetic apparatus 300, the plurality of analog circuits 3 includes analog circuits 3 in which common sum total values which are the sum total values W of the weight values $v_i$ differ from each other.

For example, it is assumed that the number of input signal line pairs P6 is denoted by N and the maximum number of synapse circuits 3 provided in each analog circuit 3 is denoted by N. That is, in a case where the synapse circuits 3 are provided associated with all the input signal line pairs P6, the number of synapse circuits 3 is maximum. Thus, in the analog circuit 3 including N synapse circuits 3, the sum total value $W^+$=the sum total value $W^-$=N×w. This N×w is the maximum sum total value $W_{max}$.

Moreover, an analog circuit 3 including N' synapse circuits 3 (N'<N) is a circuit that is connected to N' input signal line pairs P6 and is not connected the remaining (N−N') input signal line pairs P6. In this analog circuit 3, the sum total value $W^+$=the sum total value $W^-$=N'×w is established. It should be noted that the sum total value N'×w is smaller than the maximum sum total value $W_{max}$ (N'×w<$W_{max}$). Thus, the arithmetic apparatus 300 includes various weight rows 18 in which the sum total value W equal to or smaller than the maximum sum total value $W_{max}$ is set.

In the example shown in FIG. 13, four input signal line pairs P6 and three analog circuits 3 are provided. The left analog circuit 3 is constituted by four positive synapse circuits 8a. Therefore, the left analog circuit 3 includes positive and negative weight rows 18a and 18b in which the maximum sum total value $W_{max}$ (=4×w) is set.

The central analog circuit 3 includes a positive synapse circuit 8a connected to the second input signal line pair P6 from the top and negative synapse circuits 8b connected to the third and fourth input signal line pairs P6 from the top, and the sum total value of the weight values is 3×w. The right analog circuit 3 includes negative synapse circuits 8b connected to the third and fourth input signal line pairs P6 and the sum total value of the weight values is 2×w. It should be noted that the central analog circuit 3 is not connected to the first input signal line pair P6 and the right analog circuit 3 is not connected to the first and second input signal line pairs P6.

It should be noted that the configuration of the arithmetic apparatus 300 is not limited to the above-mentioned configuration. For example, the ratio of the positive and negative synapse circuits 8a and 8b included in the analog circuit 3 may be set as appropriate to enable a target calculation to be performed. That is, the ratio may be set as necessary to provide a configuration in which the positive synapse circuit 8a is 100% to a configuration in which the negative synapse circuit 8b is 100%. Alternatively, the number of synapse circuits 8 included in the analog circuit 3 may be set as appropriate within a range of N or less. As a matter of course, the correlation between each input signal line pair P6 and the synapse circuit 8 can also be arbitrarily set.

The charging circuit 40 includes charging resistors 41 and a charging line 42. In the arithmetic apparatus 300, the charging circuit 40 functions as a charging unit that charges the accumulation unit after the input period T.

The charging resistor 41 is connected between the charging line 42 and the output line 7 of each analog circuit 3. For example, two charging resistors 41 that connect the positive charge output line 7a and the negative charge output line 7b to the charging line 42 are provided in each analog circuit 3. In the example shown in FIG. 13, six charging resistors 41 provided associated with the respective output lines 7 of three analog circuits 3 are used. Those charging resistors 41 are set to have the same resistance value (conductance).

The charging resistor 41 is set to have a resistance value according to the maximum sum total value $W_{max}$. Typically, the resistance value of the charging resistor 41 is set to function as a single resistor with the maximum sum total value $W_{max}$ as the weight value.

For example, as described with reference to the expression (Formula 15), the sum total value W is a value corresponding to the combined conductance of the resistor 17 (the inverse of the combined resistance) included in one weight row 18. Therefore, the resistance value of the charging resistor 41 is set to the combined resistance of the resistors 17 included in the weight row 18, which is the maximum sum total value $W_{max}$, for example. Accordingly, the charging resistor 41 can be regarded as a weight having the weight value $W_{max}$.

The charging line 42 is a single signal line disposed to be orthogonal to the output line 7 of each analog circuit 3, for example. The charging line 42 is connected to each output line 7 via the charging resistor 41. Thus, it can also be said that the charging line 42 is connected to each capacitor 13 via the charging resistor 41.

As shown in FIG. 13, a charge signal is input into the charging line 42 at the same time as the end timing $t_n$ of the input period T. This charge signal is an electrical signal that is held in the ON state during the output period T. The voltage of the charge signal is set, for example, in the same manner as the voltage ($V_{in}$) of the input signal. Thus, the charging line 42 supplies a charge signal that enters the ON state after the input period T.

Thus, in the configuration in which the sum total values W of the weights included in the respective weight rows are different from each other, the charging line 42 for charging is provided separately from N input signal line pairs P6. That is, a charge signal (additional signal) separate from the N electrical signals input into the respective weight rows is supplied. Moreover, this charge signal is applied to the capacitors 13 of each analog circuit 3 via the charging resistor 41 having the maximum sum total value $W_{max}$ in the arithmetic apparatus 300 as the weight value.

When the input period T is started, a signal pair is input into the corresponding synapse circuit 8 via the plurality of input signal line pairs P6. For example, a signal pair is input into the left analog circuit 3 from the first to fourth input signal line pairs P6. The signal pair is input into the central analog circuit 3 from the second to fourth input signal line pairs P6 and the signal pair is input into the right analog circuit 3 from the third and fourth input signal line pairs P6.

In the synapse circuit 8 into which each signal pair is input, the positive weight charge and the negative weight charge are generated and are output to the positive charge output line 7a and the negative charge output line 7b, respectively. As a result, the multiply-accumulate operation is completed at the end timing $t_n$ of the input period T and each capacitor 13 retains the voltage corresponding to the multiply-accumulate result. It should be noted that during the input period T, the charge signal is not input and the voltage of the charging line 42 is 0.

As shown in FIG. 13, in the arithmetic apparatus 300, the plurality of input signal line pairs P6 enters the OFF state after the input period T. That is, the signal pair to be input into each input signal line pair P6 (input signal) is switched to the low level when the input period T ends. Thus, an input signal that becomes the high level by a time corresponding to the signal value during the input period T and becomes the low level during the output period T is used. Therefore, in the arithmetic apparatus 300, the input signal line pair P6 does not supply charges in the output period T.

On the other hand, when the input period T ends and the output period T is started, the charge signal is input into the charging line 42 and the voltage of the charging line 42 becomes the high level. Thus, in the output period T, the charges (current) are generated by all of the charging resistors 41 on the basis of the charge signal input into the charging line 42.

The charges generated by the respective charging resistors 41 are each accumulated in the corresponding capacitor 13 via the output line 7. Thus, at the same time as the output period T is started, charging of all the capacitors 13 is started. Thus, the charging circuit 40 charges the capacitor 13 by accumulating charges generated by the charging resistors 41 on the basis of the charge signal.

As described above, the charging resistor 41 can be regarded as a weight having the weight value $W_{max}$. Therefore, the charge generated by the charging resistor 41 on the basis of the charge signal having the same voltage as the input signal is equal to the charge generated when the input signal in the ON state is input into all the weights of the weight pair to which the maximum sum total value $W_{max}$ is set, for example.

Therefore, the voltage of the capacitor 13 charged by the charging circuit 40 varies in accordance with the expression (Formula 17). For example, all the capacitors 13 included in the left, the central, and right analog circuits 3 in FIG. 13 are charged in accordance with the time constant $T_w$ according to the maximum sum total value $W_{max}$ from a state in which voltages corresponding to the respective multiply-accumulate results are held. Thus, it is possible to charge all the capacitors 13 in accordance with the same time constant $T_w$ irrespective of the sum total value W of the weight values $v_i$ set to the weight pair by providing the charging circuit 40.

Moreover, in the output period T, the threshold determination using the common threshold value θ set on the basis of the maximum sum total value $W_{max}$ is performed on the voltages of the capacitors 13 in the output period T. The common threshold value θ is a value set using the expression (Formula 16). Thus, it is possible to simultaneously generate multiply-accumulate signals in all the weight row 18, which is normalized with the same normalization parameters (threshold value θ and output period T) irrespective of the sum total values W.

For example, it is assumed that in the arithmetic apparatus 300, the threshold value θ is set on the basis of a sum total value W' smaller than the maximum sum total value $W_{max}$. In this case, for example, the maximum multiply-accumulate result (gray dotted line in FIG. 11) calculated in the weight row 18 having the sum total value W' can be detected in the output period T. On the other hand, the maximum multiply-accumulate result calculated in the weight row 18 having the maximum sum total value $W_{max}$ can exceed the threshold value θ before the output period T is started, i.e., in the input period T. Therefore, it is difficult to properly detect the maximum multiply-accumulate result in the weight row 18 having the maximum sum total value $W_{max}$.

Moreover, it is assumed that in the arithmetic apparatus 300, the respective capacitors 13 are charged using the input signal line pairs P6 in the output period T. In this example, for example, the capacitors 13 are charged with the time constant according to $W_{max}$ in the left analog circuit 3. On the other hand, since the central analog circuit 3 is not connected to the first input signal line pair P6, the charging speed lowers. Moreover, since the right analog circuit 3 is not connected to the first and second input signal line pairs P6, the charging speed further lowers. Thus, in the charging using the input signal line pairs P6, the charging speed may vary between the respective analog circuits 3.

On the other hand, since in the arithmetic apparatus 300, the common threshold value θ is set on the basis of the maximum sum total value $W_{max}$, the voltage of the capacitor 13 does not exceed the threshold value θ in the input period T. Thus, it is possible to properly calculate the multiply-accumulate results (positive and negative multiply-accumulate signals) in all the analog circuits 3 connected to the plurality of input signal line pairs P6.

Moreover, in the arithmetic apparatus 300, the capacitor 13 is charged via the charging circuit 40 added separately from the input signal line pair P6 in the output period T. This charging is done at the time constant according to the maximum sum total value $W_{max}$. Accordingly, the variation in the charging speed are eliminated, and thus comparable multiply-accumulate results can be easily calculated.

As described above, in a case where the sum total values W of the weights of the respective analog circuits 3 (weight rows 18) are not all equal, the maximum sum total value $W_{max}$, which is the maximum value of the sum total value W of the weights, is defined, and the charging time constant $T_W$ and the common threshold value $\theta$ are specified. Accordingly, even with the configuration in which the sum total values W of the weights $v_i$ differ from each other, a proper multiply-accumulate result can be calculated by connecting the plurality of analog circuits 3 in parallel and simultaneously performing the plurality of multiply-accumulate operations.

Figure 14:
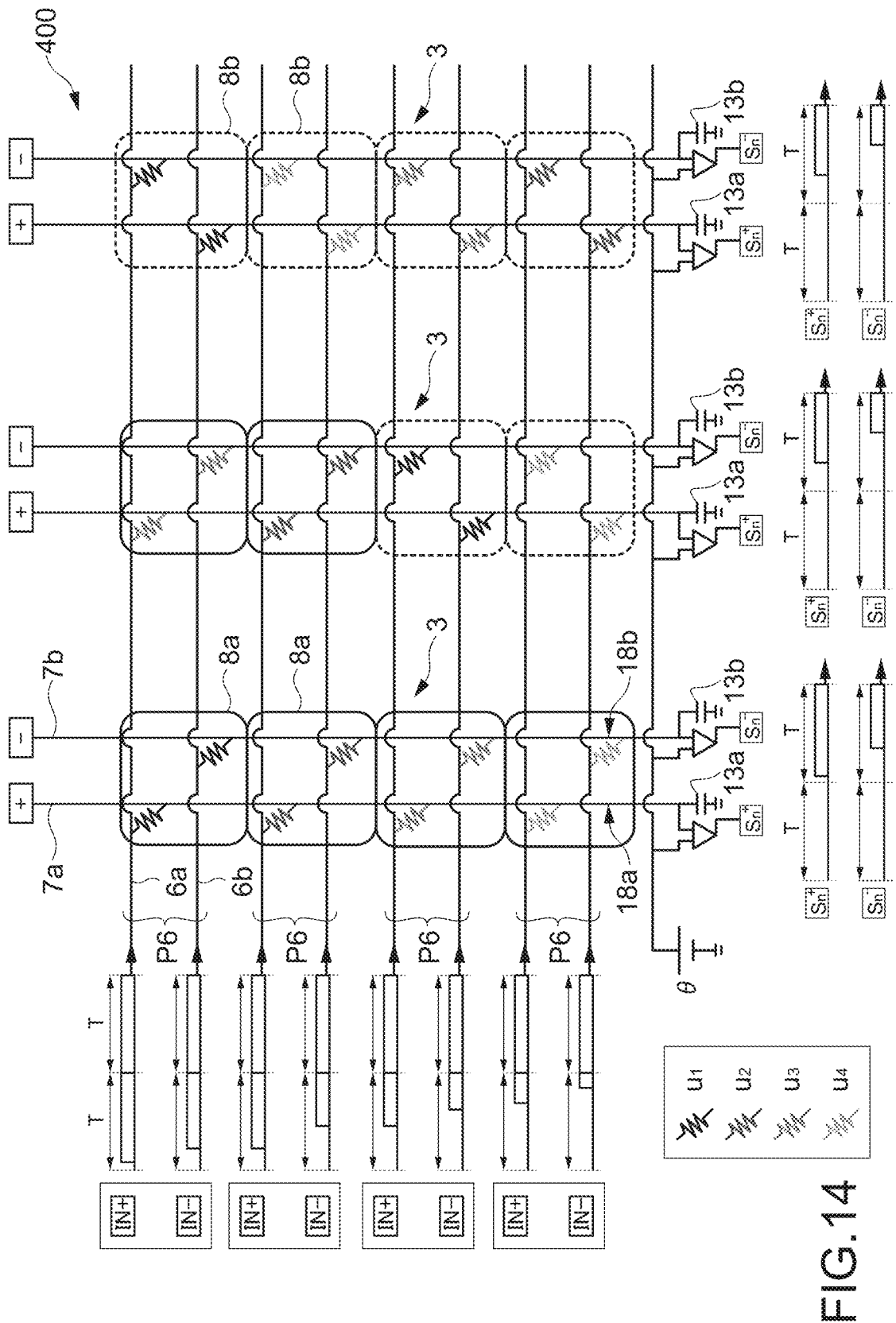
FIG. 14 A circuit diagram showing a configuration example of the arithmetic apparatus.

In an arithmetic apparatus 400 shown in FIG. 14, a multi-value weight is set and the sum total values W of the weight values $v_i$ are all set to be the same value in the weight rows 18 included in the respective analog circuits 3.

In a case where the multi-value weight is used, the pair weight value $w_i$ of each synapse circuit 8 is set to any one of a plurality of weight values (candidate weight values). Hereinafter, the candidate weight values will be represented by $\{u_j\}$. The candidate weight values $\{u_j\}$ are a set of candidate values for the weight value, for example, $\{u_j\}$= (−1, −0.5, 0, 0.5, 1). The pair weight value $w_i$ is set by selecting from these candidate weight values $u_j$ as appropriate. The number of candidate weight values, specific values, and the like are not limited.

It should be noted that positive and negative weight values ($v_i^+$ and $|v_i^-|$) set in one synapse circuit 8 are set to be the same value (candidate weight value $u_j$). For example, in the synapse circuit 8 in which the pair weight value $w_i$ is set to 0.5, both the positive and negative weight values are set to 0.5. Thus, the positive weight value $v_i^+$ and the absolute value $|v_i^-|$ of the negative weight value $v_i^-$ are set to any one of the plurality of values $\{u_j\}$ different from each other.

Moreover, in the arithmetic apparatus 400, the number of synapse circuits 8 (weight pairs) included in each of the analog circuits 3 (weight rows 18) is set to be the same number, and the sum total value W of the weight values $v_i$ is set to be the same value. Therefore, in the plurality of analog circuits 3 in the arithmetic apparatus 400, the common sum total values which are the sum total values W of the weight values $v_i$ are set to be the same value W. The sum total value W of the weight values $v_i$ common to all the weight rows 18*a* is the maximum sum total value $W_{max}$.

In the example shown in FIG. 14, four input signal line pairs P6 and three analog circuits 3 are provided. Moreover, each analog circuit 3 is provided with four synapse circuits 8 respectively connected to the four input signal line pairs P6.

Moreover, in FIG. 14, four types of candidate weight values $u_j$=($u_1$, $u_2$, $u_3$, $u_4$) are used. The respective resistors 17 to which $u_1$, $u_2$, $u_3$, and $u_4$ are set are schematically shown such that the gray color is lighter in the stated order. Moreover, each weight row 18 always includes one resistor 17 set to have $u_1$, $u_2$, $u_3$, or $u_4$ as the positive weight (negative weight). Therefore, the sum total value W of the weight values $v_i$ is $W=W^+=W^-=(u_1+u_2+u_3+u_4)=W_{max}$.

For example, in FIG. 12, the left analog circuit 3 is constituted by four positive synapse circuits 8*a* in which the weight values $u_1$, $u_2$, $u_3$, and $u_4$ in order from the top are set. Regarding the central analog circuit 3, positive synapse circuits 8*a* having the weight values set to $u_3$ and $u_2$ are provided as first and second circuits from the top and negative synapse circuits 8*b* having the weight values set to $u_1$ and $u_4$ as third and fourth circuits are provided. The right analog circuit 3 is constituted by four negative synapse circuits 8*a* in which the weight values $u_1$, $u_4$, $u_3$, $u_2$ in order from the top are set.

When the input period T is started, a signal pair is input into the corresponding synapse circuit 8 via the plurality of input signal line pairs P6 and charges are output from the respective resistors. At the end timing $t_n$ of the input period T, the accumulation of the charge corresponding to the sum of the product values is completed and the voltages of the capacitors 13 become the voltages representing the multiply-accumulate results.

In the arithmetic apparatus 400, a signal that continuously maintains the ON state also during the output period T is used as each signal pair (input signal). That is, the charge signal that enters the ON state after the input period T is supplied through the plurality of input signal line pairs P6.

As described above, the sum total value W of the weight values $v_i$ is set to be the same value (maximum sum total value $W_{max}$) in each weight row 18 included in the arithmetic apparatus 400. Therefore, the time constant $T_W$ when charging each capacitor 13 is common. As a result, during the output period T, all the capacitors 13 included in the arithmetic apparatus 400 are charged in accordance with the curve represented by the expression (Formula 17).

The threshold determination using the common threshold value $\theta$ calculated in accordance with the expression (Formula 16) on the basis of the maximum sum total value $W_{max}$ is performed on each charged capacitor 13. Accordingly, it is possible to simultaneously generate a plurality of comparable multiply-accumulate signals. Thus, even in a case where the multi-value weight is used, making the sum total value W of each weight row 18 constant enables charging using the input signal line pair P6 to be performed, and the circuit configuration can be simplified. Moreover, it is possible to properly calculate the multiply-accumulate result by setting the threshold value $\theta$ on the basis of the common sum total value W ($W_{max}$).

Figure 15:
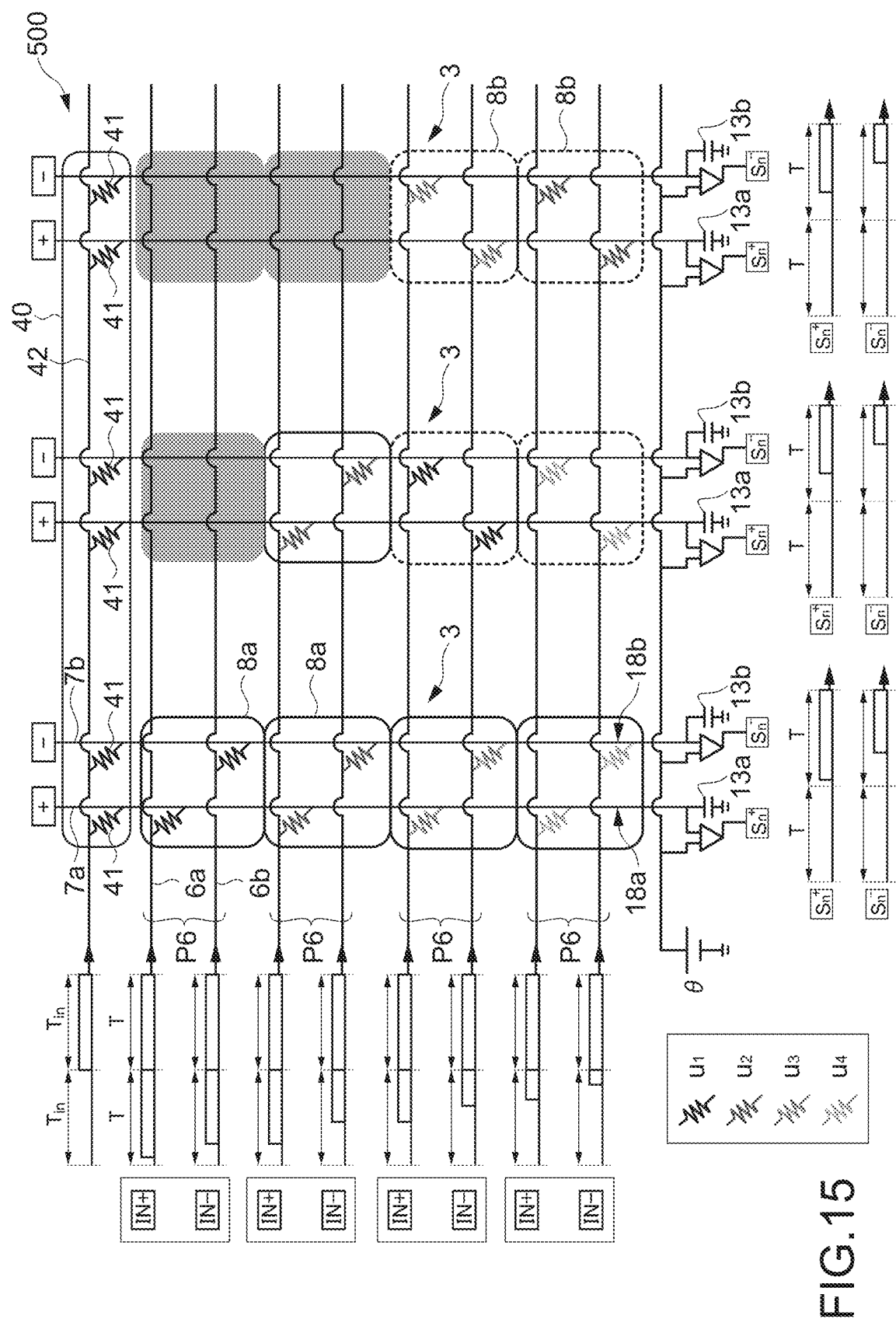
FIG. 15 A circuit diagram showing a configuration example of the arithmetic apparatus.

In the arithmetic apparatus 500 shown in FIG. 15, the multi-value weight is set and the analog circuits 3 (weight row 18) in which the sum total values W of the weight values $v_i$ differ from each other are used.

The arithmetic apparatus 500 includes a plurality of input signal line pairs P6, a plurality of analog circuits 3, and a charging circuit 40. The number of synapse circuits 8 (weight pairs) included in each analog circuit 3 (weight row 18) is set for each analog circuit 3. Moreover, in each synapse circuit 8, the weight value selected as appropriate from among the candidate weight values $u_j$ is set. Therefore, in the arithmetic apparatus 500, the plurality of analog circuits 3 includes analog circuits 3 in which the common sum total values which are the sum total values W of the weight values $v_i$ differ from each other.

Since the multi-value weight is used in the arithmetic apparatus 500, the sum total value W of the weight value $v_i$ is calculated as the sum total of the candidate weight values $u_j$ set in all the synapse circuits 8 (weight pairs) included in one analog circuit 3. Therefore, even in a case where the number of synapse circuits 8 is large, the sum total value W is not necessarily large, and conversely, even in a case where the number of synapse circuits 8 is small, the sum total value W may be large. A sum total value W of such sum total values W, which is the largest among the plurality of analog circuits 3, is the maximum sum total value $W_{max}$.

In the example shown in FIG. 15, four input signal line pairs P6 and three analog circuits 3 are provided. Moreover, four kinds of candidate weight values $u_j=(u_1, u_2, u_3, u_4)$ are used as the weight values.

The left analog circuit 3 includes positive synapse circuits 8a whose weight values are $u_1$, $u_2$, $u_3$, and $u_4$ in order from the top. The central analog circuit 3 includes a positive synapse circuit 8a which is connected to the second input signal line pair P6 from the top and whose weight value is $u_2$ and negative synapse circuits 8b which are connected to the third and fourth input signal line pairs P6 from the top and whose weight values are $u_1$ and $u_4$. The right analog circuit 3 includes negative synapse circuits 8b which are connected to the third and fourth input signal line pairs P6 and whose weight values are $u_3$ and $u_2$. Among these analog circuits 3, the sum total value W ($=u_1+u_2+u_3+u_4$) of the weight values of the left analog circuit 3 is the maximum sum total value $W_{max}$.

It should be noted that the configuration of the arithmetic apparatus 500 is not limited to the above-mentioned configuration. For example, the number of synapse circuits 8 included in the analog circuit 3, the ratio of the positive and negative synapse circuits 8a and 8b, the candidate weight value set in each synapse circuit 8, and the like may be set as appropriate to enable a target calculation to be performed. Moreover, the correlation between each input signal line pair P6 and the synapse circuit 8 can also be arbitrarily set.

The charging circuit 40 is configured by using charging resistors 41 and a charging line 42 (see FIG. 13). The charging resistor 41 is set to have a resistance value according to the maximum sum total value $W_{max}$. This charging resistor 41 is connected between each of the output lines 7 (positive charge output lines 7a and 7b) of each analog circuit 3 and the charging line 42.

When the input period T is started, a signal pair is input into the corresponding synapse circuit 8 via the plurality of input signal line pairs P6 and charges are output from the respective resistors. At the end timing $t_n$ of the input period T, the accumulation of the charge corresponding to the sum of the product values is completed and the voltages of the capacitors 13 become the voltages representing the multiply-accumulate results. It should be noted that in the arithmetic apparatus 500, the plurality of input signal line pair P6 enters the OFF state after the input period T.

When the input period T ends and the output period T is started, the charge signal is input into the charging line 42 and the voltage of the charging line 42 becomes the high level. Thus, in the output period T, charges (current) are generated by all of the charging resistors 41 on the basis of the charge signal input into the charging line 42, such that each capacitor 13 is charged. Since the charging resistor 41 is set to have a resistance value according to the maximum sum total value $W_{max}$, the voltage of the capacitor 13 charged by the charging circuit 40 changes in accordance with the expression (Formula 17).

The threshold determination using the common threshold value θ calculated in accordance with the expression (Formula 16) on the basis of the maximum sum total value $W_{max}$ is performed on each charged capacitor 13. Accordingly, it is possible to simultaneously generate a plurality of comparable multiply-accumulate signals. As described above, even in a case where the multi-value weight is used and the common sum total values which are the sum total values W of the weight values $v_i$ differ from each other, each capacitor 13 can be charged in accordance with the same time constant $T_W$ by using the charging circuit 40. Moreover, it is possible to properly calculate the multiply-accumulate result by setting the threshold value θ on the basis of the maximum sum total value $W_{max}$.

It should be noted that in a case where the multi-value weight is used, the configuration in which the sum total values W of the weight values $v_i$ are equal (configuration in FIG. 12) is not necessarily provided even if the number of synapse circuits 3 provided in each analog circuit 3 is the same. Even in such a case, the parallelization of the plurality of analog circuits 3 can be easily achieved by providing the charging circuit 40 and setting the charging time constant and the threshold value on the basis of the maximum sum total value $W_{max}$.

On the other hand, even in a case where the number of synapse circuits 3 provided in each analog circuit 3 is different, the sum total values W of the weight values $v_i$ can be made the same in all the analog circuits 3 in the configuration using the multi-value weight. In such a configuration, the capacitor 13 may be charged directly from the plurality of input signal line pairs P6 without providing the charging circuit 40, for example. In this case, since the sum total values W are the same, it is possible to charge each capacitor 13 on the common charging mode. For example, such a configuration may be employed.

As described above, at the one or more analog circuits 3 in the arithmetic apparatuses 100 to 500 according to this embodiment, the positive weight charge and the negative weight charge are generated by multiplying the respective signal values of the signal pair corresponding to the input value $x_i$ by the positive and negative weight values and are accumulated in the accumulation unit 11. The accumulation unit 11 is charged by the charging unit 15 and the threshold determination is performed on that voltage by using the predetermined threshold value θ, to thereby output the positive and negative multiply-accumulate signals. Thus, the circuit or the like for integrating arithmetic operation results into one signal can be omitted. Moreover, in the one or more analog circuits 3, charging by the charging unit 15 is performed on the common charging mode and the common threshold value θ is used for threshold determination. Thus, the operation of each analog circuit 3 can be properly performed at the same timing. As a result, it is possible to simplify the circuit configuration and realize high-speed arithmetic operation processing.

A method of generating a total multiply-accumulate signal representing the difference between the positive and negative multiply-accumulate results is conceivable as a method of calculating the multiply-accumulate result. In this case, it is necessary to provide a logic circuit or the like for calculating the difference, and the circuit configuration may be complicated and the power consumption may increase. Moreover, when calculating a difference between the output times of the positive and negative multiply-accumulate results and outputting the difference, the accuracy of the calculation result may lower in a manner that depends on the performance of time resolution of the circuit for calculating the difference. Furthermore, the accuracy of a final multiply-accumulate result may be deteriorated due to operation variations and environmental variations of the transistors constituting the circuit for calculating the difference.

In this embodiment, the positive and negative multiply-accumulate signals are output from the multiply-accumulate results of the analog circuits 3. These positive and negative multiply-accumulate signals can be used as they are as the inputs (signal pairs) of the next layer. Therefore, the difference circuit for generating a final multiply-accumulate signal from the positive and negative multiply-accumulate signals becomes unnecessary, and it is thus possible to simplify the circuit configuration. Moreover, since the difference circuit is not provided, it is possible to significantly reduce the power consumption of the arithmetic apparatus.

Moreover, in this embodiment, the charging processing for reading the positive and negative multiply-accumulate results is performed in each analog circuit 3 on the common charging mode and the positive and negative multiply-accumulate signals are generated by using the common threshold value θ. The charging time constant $T_w$ and the threshold value θ are set on the basis of the maximum sum total value $W_{max}$ in the analog circuit 3. Accordingly, it is possible to output the properly normalized positive and negative multiply-accumulate signals from all the analog circuits 3, for example.

By making the charging mode and the threshold value θ common as described above, it is possible to connect the analog circuit 3 in which the "signal pair" and the "weight pair" are used in parallel to the plurality of input signal line pairs P6. As a result, it is possible to perform parallel operations of a plurality of "multiply-accumulate operations", i.e., simultaneous operations with respect to one input at a time, and high-speed operations and efficient operations according to the analog method can be realized.

For example, a method called multilayer perceptron (MLP) may be used in an algorithm for deep learning. The MLP can have, for example, a fully connected configuration, and there is no need to perform special processing and the like between the multiply-accumulate operation of the previous stage and the multiply-accumulate operation of the subsequent stage. Therefore, if it is possible to reduce the processing of calculating the final multiply-accumulate signal (difference between positive and negative multiply-accumulate results) after the multiply-accumulate operation, it is possible to reduce the circuit and the like for calculating the difference. In this case, it is possible to implement an MLP network only with a crossbar wiring structure and a comparator circuit using resistors (resistor elements) as weights without providing an unnecessary circuit, and it is possible to perform high-speed arithmetic operation processing with an extremely simplified circuit configuration.

OTHER EMBODIMENTS

The present technology is not limited to the embodiment described above, and various other embodiments can be realized.

Hereinabove, the case where the weight values of the positive weight and the negative weight constituting the weight pair (synapse circuit) are equal to each other has been mainly described. The present technology is not limited thereto, and the analog circuit may include synapse circuits in which positive and negative weights are set to be weight values different from each other. In this case, the sum total value of the weight values of the positive weight row is not always equal to the sum value of the weight values of the negative weight row.

Also with such a configuration, it is possible to calculate the multiply-accumulate results in all the analog circuit 3 in the output period by setting the charging time constant and the threshold value on the basis of the maximum value (maximum sum total value) of the sum total value of the weight values in each weight row connected to each input signal line pair, for example. Accordingly, it is possible to perform the multiply-accumulate operation over multiple layers without delay.

In the above description, the charging time constant, the threshold value, and the like are set on the basis of the voltage curve of the capacitor. The method of setting the charging time constant, the threshold value, and the like is not limited. For example, by approximating the change in voltage of the capacitor linearly as described with reference to FIG. 8 and the like, the charging time constant (charging rate), the threshold value, and the like may be set in accordance with the gradient or the like. Accordingly, it is possible to easily calculate each parameter. In addition, parameters and threshold value θ for charging may be set by using any method.

The parasitic capacitance of each synapse circuit may be used as the accumulation unit. In this case, the parasitic capacitance of each synapse circuit functions as the capacitor. For example, the arithmetic apparatus is configured such that the combined capacitance of the parasitic capacitance has the same value in each analog circuit. Also in such a case, it is possible to set the time constant and the threshold value on the basis of the maximum sum total value and the combined capacitance, and it is possible to properly output the positive and negative multiply-accumulate signals.

At least two of the features of the present technology described above can also be combined. In other words, various features described in the respective embodiments may be combined discretionarily irrespective of the embodiments. Moreover, the various effects described above are not limitative but are merely illustrative, and other effects may be provided.

In the present disclosure, "the same", "equal", "orthogonal", and the like are concepts including "substantially the same", "substantially equal", "substantially orthogonal", and the like. For example, the states included in a predetermined range (e.g., a range of ±10%) with reference to "completely the same", "completely equal", "completely orthogonal", and the like are also included.

It should be noted that the present technology can also take the following configurations.
(1) An arithmetic apparatus, including:
  a plurality of input line pairs into each of which a signal pair corresponding to an input value is input within a predetermined input period; and
    one or more multiply-accumulate devices each including
    a plurality of multiplication units that is respectively connected to at least some of the plurality of input line pairs and is capable of generating each of a positive weight charge corresponding to a positive weight product value obtained by multiplying a signal value of one signal of the signal pair input into the input line pair to which the multiplication unit is connected by a positive weight value and a negative weight charge corresponding to a negative weight product value obtained by multiplying a signal value of another signal by a negative weight value,
    an accumulation unit capable of accumulating the positive weight charge and the negative weight charge which are generated by each of the plurality of multiplication units,
    a charging unit that charges the accumulation unit in which a charge corresponding to the product value is accumulated after the input period, and
    an output unit that performs, after charging by the charging unit starts, threshold determination using a predetermined threshold value on a voltage retained by the accumulation unit, to thereby output a positive multiply-accumulate signal representing a sum of the positive weight product values and a negative multiply-accumulate signal representing a sum of the negative weight product values, in which in the one or more multiply-accumulate devices, charging by the charging unit is performed on a common charging mode and a common threshold value is set as the predetermined threshold value.

(2) The arithmetic apparatus according to (1), in which
the common charging mode includes charging according to a common time constant.

(3) The arithmetic apparatus according to (1) or (2), in which
the common charging mode includes charging based on a maximum sum total value of a sum total value of the positive weight values and a sum total value of absolute values of the negative weight values, the maximum sum total value being maximum among the one or more multiply-accumulate devices, the positive weight values and the negative weight values being set in the plurality of multiplication units.

(4) The arithmetic apparatus according to (3), in which
the common charging mode charges the accumulation unit in accordance with a time constant according to the maximum sum total value.

(5) The arithmetic apparatus according to (4), in which
the plurality of input line pairs supplies a charging signal that enters an ON state after the input period, and
the charging unit charges the accumulation unit by accumulating charges generated by the plurality of multiplication units on the basis of the charging signal.

(6) The arithmetic apparatus according to (4) or (5), in which
the charging unit includes a resistor for charging and a charging line that is connected to the accumulation unit via the resistor for charging and supplies a charging signal that enters an ON state after the input period.

(7) The arithmetic apparatus according to (6), in which
the resistor for charging is set to have a resistance value according to the maximum sum total value.

(8) The arithmetic apparatus according to (6) or (7), in which
the plurality of input line pairs enters an OFF state after the input period, and
the charging unit charges the accumulation unit by accumulating a charge generated by the resistor for charging on the basis of the charging signal.

(9) The arithmetic apparatus according to any one of (3) to (8), in which
the common threshold value is set on the basis of the maximum sum total value.

(10) The arithmetic apparatus according to any one of (3) to (9), in which
the common threshold value is set on the basis of a voltage curve representing a change in voltage of the accumulation unit over time in a case where the accumulation unit is charged via a resistor having a resistance value according to the maximum sum total value.

(11) The arithmetic apparatus according to any one of (1) to (10), in which
the positive weight value and an absolute value of the negative weight value are set to a same value for each of the plurality of multiplication units.

(12) The arithmetic apparatus according to any one of (1) to (11), in which
the positive weight value and an absolute value of the negative weight value are fixed to a same value.

(13) The arithmetic apparatus according to any one of (1) to (12), in which the positive weight value and an absolute value of the negative weight value are set to any one of a plurality of values different from each other.

(14) The arithmetic apparatus according to any one of (1) to (13), in which
the one or more multiply-accumulate devices are a plurality of multiply-accumulate devices connected in parallel to the plurality of input line pairs.

(15) The arithmetic apparatus according to (14), in which
a sum total value of the positive weight values and a sum total value of absolute values of the negative weight values are set to common sum total values equal to each other in the multiply-accumulate device, and
the plurality of multiply-accumulate devices includes the common sum total values set to a same value.

(16) The arithmetic apparatus according to (14), in which
a sum total value of the positive weight values and a sum total value of absolute values of the negative weight values are set to common sum total values equal to each other in the multiply-accumulate device, and
the plurality of multiply-accumulate devices includes multiply-accumulate devices including the common sum total values different from each other.

(17) The arithmetic apparatus according to any one of (1) to (16), in which
the input value is represented by a sum of a positive value and a negative value,
the signal pair includes a positive signal having the positive value as a signal value and a negative signal having an absolute value of the negative value as a signal value, and
the plurality of multiplication units includes at least one of a first multiplication unit that generates the positive weight charge by multiplying a signal value of the positive signal by the positive weight value and generates the negative weight charge by multiplying a signal value of the negative signal by the negative weight value or a second multiplication unit that generates the positive weight charge by multiplying a signal value of the negative signal by the positive weight value and that generates the negative weight charge by multiplying a signal value of the positive signal by the negative weight value.

(18) The arithmetic apparatus according to (17), in which
the plurality of input line pairs each includes a positive input line into which the positive signal is input and a negative input line into which the negative signal is input,
the one or more multiply-accumulate devices include a positive charge output line and a negative charge output line,
the first multiplication unit includes a resistor that is connected between the positive input line and the positive charge output line, defines the positive weight value, and outputs the positive weight charge to the positive charge output line and a resistor that is connected between the negative input line and the negative charge output line, defines the negative weight value, and outputs the negative weight charge to the negative charge output line, and
the second multiplication unit includes a resistor that is connected between the negative input line and the positive charge output line, defines the positive weight value, and outputs the positive weight charge to the positive charge output line and a resistor that is connected between the positive input line and the negative charge output line, defines the negative weight value, and outputs the negative weight charge to the negative charge output line.

(19) The arithmetic apparatus according to (18), in which
the accumulation unit includes a positive charge accumulation unit that is connected to the positive charge output line and accumulates the positive weight charge and a negative charge accumulation unit that is connected to the negative charge output line and accumulates the negative weight charge, the charging unit charges each of the positive charge accumulation unit and the negative charge accumulation unit, and the output unit performs threshold determination using the common threshold value on the positive charge accumulation unit to thereby output the positive multiply-accumulate signal and performs threshold determination using the common threshold value on the negative charge accumulation unit to thereby output the negative multiply-accumulate signal.

(20) A multiply-accumulate system, including:
a plurality of input line pairs into each of which a signal pair corresponding to an input value is input within a predetermined input period;
a plurality of analog circuits each including
a plurality of multiplication units that is respectively connected to at least some of the plurality of input line pairs and is capable of generating each of a positive weight charge corresponding to a positive weight product value obtained by multiplying a signal value of one signal of the signal pair input into the input line pair to which the multiplication unit is connected by a positive weight value and a negative weight charge corresponding to a negative weight product value obtained by multiplying a signal value of another signal by a negative weight value,
an accumulation unit capable of accumulating the positive weight charge and the negative weight charge which are generated by each of the plurality of multiplication units,
a charging unit that charges the accumulation unit in which a charge corresponding to the product value is accumulated after the input period, and
an output unit that performs, after charging by the charging unit starts, threshold determination using a predetermined threshold value on a voltage retained by the accumulation unit, to thereby output a positive multiply-accumulate signal representing a sum of the positive weight product values and a negative multiply-accumulate signal representing a sum of the negative weight product values; and
a network circuit configured by connecting the plurality of analog circuits, in which
in the plurality of analog circuits, charging by the charging unit is performed on a common charging mode and a common threshold value is set as the predetermined threshold value.

REFERENCE SIGNS LIST 3, 3a, 3b analog circuit
P6 input signal line pair
   6a positive input signal line
   6b negative input signal line
   7 output line
   7a positive charge output line
   7b negative charge output line
   8 synapse circuit
   8a positive synapse circuit
   8b negative synapse circuit
   11 accumulation unit
   12 signal output unit
   13a capacitor
   13b capacitor
   15 charging unit
   17 resistor
   17a first resistor
   17b second resistor
   17c third resistor
   17d fourth resistor
   40 charging circuit
   41 resistor for charging
   42 charging line
100, 200, 300, 400, 500 arithmetic apparatus

The invention claimed is:

1. An arithmetic apparatus, comprising:
a plurality of input line pairs into each of which a signal pair corresponding to an input value is input within an input period; and
one or more multiply-accumulate devices each including
a plurality of multiplication units that is respectively connected to at least some of the plurality of input line pairs and is configured for generating each of a positive weight charge corresponding to a positive weight product value obtained by multiplying a signal value of one signal of the signal pair input into a corresponding input line pair to which a corresponding multiplication unit is connected by a positive weight value and a negative weight charge corresponding to a negative weight product value obtained by multiplying a signal value of another signal by a negative weight value,
an accumulation unit configured for accumulating the positive weight charge and the negative weight charge which are generated by each of the plurality of multiplication units,
a charging unit that charges the accumulation unit in which a charge corresponding to a corresponding product value is accumulated after the input period, and
an output unit that performs, after charging by the charging unit starts, threshold determination using a predetermined threshold value on a voltage retained by the accumulation unit, to thereby output a positive multiply-accumulate signal representing a sum of the positive weight product values and a negative multiply-accumulate signal representing a sum of the negative weight product values, wherein
in the one or more multiply-accumulate devices, charging by the charging unit is performed on a common charging mode and a common threshold value is set as the predetermined threshold value.

2. The arithmetic apparatus according to claim 1, wherein the common charging mode includes charging according to a common time constant.

3. The arithmetic apparatus according to claim 1, wherein the common charging mode includes charging based on a maximum sum total value of a sum total value of the positive weight values and a sum total value of absolute values of the negative weight values, the maximum sum total value being maximum among the one or more multiply-accumulate devices, the positive weight values and the negative weight values being set in the plurality of multiplication units.

4. The arithmetic apparatus according to claim 3, wherein the common charging mode charges the accumulation unit in accordance with a time constant according to the maximum sum total value.

5. The arithmetic apparatus according to claim 4, wherein the plurality of input line pairs supplies a charging signal that enters an ON state after the input period, and
the charging unit charges the accumulation unit by accumulating charges generated by the plurality of multiplication units on a basis of the charging signal.

6. The arithmetic apparatus according to claim 4, wherein the charging unit includes a resistor for charging and a charging line that is connected to the accumulation unit via the resistor for charging and supplies a charging signal that enters an ON state after the input period.

7. The arithmetic apparatus according to claim 6, wherein the resistor for charging is set to have a resistance value according to the maximum sum total value.

8. The arithmetic apparatus according to claim 6, wherein
the plurality of input line pairs enters an OFF state after the input period, and
the charging unit charges the accumulation unit by accumulating a charge generated by the resistor for charging on a basis of the charging signal.

9. The arithmetic apparatus according to claim 3, wherein the common threshold value is set on a basis of the maximum sum total value.

10. The arithmetic apparatus according to claim 3, wherein
the common threshold value is set on a basis of a voltage curve representing a change in voltage of the accumulation unit over time in a case where the accumulation unit is charged via a resistor having a resistance value according to the maximum sum total value.

11. The arithmetic apparatus according to claim 1, wherein the positive weight value and an absolute value of the negative weight value are set to a same value for each of the plurality of multiplication units.

12. The arithmetic apparatus according to claim 1, wherein the positive weight value and an absolute value of the negative weight value are fixed to a same value.

13. The arithmetic apparatus according to claim 1, wherein the positive weight value and an absolute value of the negative weight value are set to any one of a plurality of values different from each other.

14. The arithmetic apparatus according to claim 1, wherein the one or more multiply-accumulate devices are a plurality of multiply-accumulate devices connected in parallel to the plurality of input line pairs.

15. The arithmetic apparatus according to claim 14, wherein
a sum total value of the positive weight values and a sum total value of absolute values of the negative weight values are set to common sum total values equal to each other in the multiply-accumulate device, and
the plurality of multiply-accumulate devices includes the common sum total values set to a same value.

16. The arithmetic apparatus according to claim 14, wherein
a sum total value of the positive weight values and a sum total value of absolute values of the negative weight values are set to common sum total values equal to each other in the multiply-accumulate device, and
the plurality of multiply-accumulate devices includes multiply-accumulate devices including the common sum total values different from each other.

17. The arithmetic apparatus according to claim 1, wherein
the input value is represented by a sum of a positive value and a negative value, the signal pair includes a positive signal having the positive value as a signal value and a negative signal having an absolute value of the negative value as a signal value, and
the plurality of multiplication units includes at least one of a first multiplication unit that generates the positive weight charge by multiplying a signal value of the positive signal by the positive weight value and generates the negative weight charge by multiplying a signal value of the negative signal by the negative weight value or a second multiplication unit that generates the positive weight charge by multiplying a signal value of the negative signal by the positive weight value and that generates the negative weight charge by multiplying a signal value of the positive signal by the negative weight value.

18. The arithmetic apparatus according to claim 17, wherein
the plurality of input line pairs each includes a positive input line into which the positive signal is input and a negative input line into which the negative signal is input,
the one or more multiply-accumulate devices include a positive charge output line and a negative charge output line,
the first multiplication unit includes a resistor that is connected between the positive input line and the positive charge output line, defines the positive weight value, and outputs the positive weight charge to the positive charge output line and a resistor that is connected between the negative input line and the negative charge output line, defines the negative weight value, and outputs the negative weight charge to the negative charge output line, and
the second multiplication unit includes a resistor that is connected between the negative input line and the positive charge output line, defines the positive weight value, and outputs the positive weight charge to the positive charge output line and a resistor that is connected between the positive input line and the negative charge output line, defines the negative weight value, and outputs the negative weight charge to the negative charge output line.

19. The arithmetic apparatus according to claim 18, wherein
the accumulation unit includes a positive charge accumulation unit that is connected to the positive charge output line and accumulates the positive weight charge and a negative charge accumulation unit that is connected to the negative charge output line and accumulates the negative weight charge,
the charging unit charges each of the positive charge accumulation unit and the negative charge accumulation unit, and
the output unit performs threshold determination using the common threshold value on the positive charge accumulation unit to thereby output the positive multiply-accumulate signal and performs threshold determination using the common threshold value on the negative charge accumulation unit to thereby output the negative multiply-accumulate signal.

20. A multiply-accumulate system, comprising:
a plurality of input line pairs into each of which a signal pair corresponding to an input value is input within an input period;
a plurality of analog circuits each including a plurality of multiplication units that is respectively connected to at least some of the plurality of input line pairs and is configured for generating each of a positive weight charge corresponding to a positive weight product value obtained by multiplying a signal value of one signal of the signal pair input into a corresponding input line pair to which a corresponding multiplication unit is connected by a positive weight value and a negative weight charge corresponding to a negative weight product value obtained by multiplying a signal value of another signal by a negative weight value,
an accumulation unit configured for accumulating the positive weight charge and the negative weight charge which are generated by each of the plurality of multiplication units,
a charging unit that charges the accumulation unit in which a charge corresponding to a corresponding product value is accumulated after the input period, and
an output unit that performs, after charging by the charging unit starts, threshold determination using a predetermined threshold value on a voltage retained by the accumulation unit, to thereby output a positive multiply-accumulate signal representing a sum of the positive weight product values and a negative multiply-accumulate signal representing a sum of the negative weight product values; and
a network circuit configured by connecting the plurality of analog circuits, wherein
in the plurality of analog circuits, charging by the charging unit is performed on a common charging mode and a common threshold value is set as the predetermined threshold value.

21. An arithmetic apparatus, comprising:
a plurality of input line pairs into each of which a signal pair corresponding to an input value is input within an input period; and
a multiply-accumulate device including a plurality of multiplication circuits, an accumulation circuit, a charging circuit and an output circuit, wherein
the plurality of multiplication circuits are respectively connected to at least some of the plurality of input line pairs and are configured to generate each of a positive weight charge corresponding to a positive weight product value obtained by multiplying a signal value of one signal of a corresponding signal pair input into a corresponding input line pair to which a corresponding multiplication circuit is connected by a positive weight value and a negative weight charge corresponding to a negative weight product value obtained by multiplying a signal value of another signal by a negative weight value,
the accumulation circuit is configured to accumulate the positive weight charge and the negative weight charge which are generated by each of the plurality of multiplication circuits,
the charging circuit is configured to charge the accumulation circuit in which a charge corresponding to a corresponding product value is accumulated after the input period,
the output circuit is configured to perform, after charging by the charging circuit starts, threshold determination using a predetermined threshold value on a voltage retained by the accumulation circuit, to thereby output a positive multiply-accumulate signal representing a sum of the positive weight product values and a negative multiply-accumulate signal representing a sum of the negative weight product values, and
in the multiply-accumulate device, charging by the charging circuit is performed on a common charging mode and a common threshold value is set as the predetermined threshold value.

22. The arithmetic apparatus according to claim 21, wherein the common charging mode includes charging according to a common time constant.

23. The arithmetic apparatus according to claim 21, wherein the common charging mode includes charging based on a maximum sum total value of a sum total value of the positive weight values and a sum total value of absolute values of the negative weight values, the positive weight values and the negative weight values being set in the plurality of multiplication circuits.

24. The arithmetic apparatus according to claim 23, wherein the common charging mode charges the accumulation circuit in accordance with a time constant according to the maximum sum total value.

* * * * *